US010574463B2

(12) United States Patent
Woo

(10) Patent No.: US 10,574,463 B2
(45) Date of Patent: Feb. 25, 2020

(54) AUTHENTICATION METHOD AND SYSTEM

(71) Applicant: eStorm Co., LTD, Seoul (KR)

(72) Inventor: Jong Hyun Woo, Seoul (KR)

(73) Assignee: eStorm Co., LTD, Seoul (KR)

( * ) Notice: Subject to any disclaimer, the term of this patent is extended or adjusted under 35 U.S.C. 154(b) by 0 days.

(21) Appl. No.: 16/377,242

(22) Filed: Apr. 7, 2019

(65) Prior Publication Data

US 2019/0238336 A1 Aug. 1, 2019

Related U.S. Application Data

(63) Continuation of application No. 15/540,035, filed as application No. PCT/KR2016/000951 on Jan. 28, 2016, now Pat. No. 10,298,400.

(30) Foreign Application Priority Data

Feb. 6, 2015 (KR) .................. 10-2015-0018752
May 4, 2015 (KR) .................. 10-2015-0062552
(Continued)

(51) Int. Cl.
*H04L 29/06* (2006.01)
*H04L 9/32* (2006.01)
(Continued)

(52) U.S. Cl.
CPC .......... *H04L 9/3228* (2013.01); *H04L 9/0643* (2013.01); *H04L 9/0863* (2013.01);
(Continued)

(58) Field of Classification Search
CPC . H04L 63/0838; H04L 9/3228; H04L 9/3213; H04L 9/0863; H04L 9/32; H04L 9/0643
(Continued)

(56) References Cited

U.S. PATENT DOCUMENTS 5,491,752 A * 2/1996 Kaufman .............. G06F 21/335
380/30
6,360,254 B1 * 3/2002 Linden .................... G06F 21/31
709/219
(Continued)

FOREIGN PATENT DOCUMENTS

KR 10-2010-0136371 A 12/2010
KR 10-1028882 B1 4/2011
(Continued)

OTHER PUBLICATIONS

M'Raihi, David, et al. "OCRA: Oath challenge-response algorithm." URL< http://tools. ietf. org/html/rfc6287 (2011). (Year: 2011).*

(Continued)

*Primary Examiner* — Syed A Zaidi
(74) *Attorney, Agent, or Firm* — Revolution IP, PLLC

(57) ABSTRACT

Provided is a computer implemented method for performing mutual authentication between an online service server and a service user, including: (a) generating, by an authentication server, a server inspection OTP; (b) generating, by an OTP generator, a verification OTP having the same condition as the server inspection OTP and using the same generation key as an OTP generation key and a calculation condition different from a calculation condition is applied or a generation key different from the OTP generation key is used and the same calculation condition as the calculation condition used for generating the server inspection OTP is applied to generate a user OTP; and (c) generating, by the authentication server, a corresponding OTP having the same condition as the user OTP and comparing whether the generated corresponding OTP and the user OTP match each other to authenticate the service user.

8 Claims, 26 Drawing Sheets

(30) Foreign Application Priority Data

| | | | |
|---|---|---|---|
| May 28, 2015 | (KR) | ........................ | 10-2015-0074949 |
| Sep. 14, 2015 | (KR) | ........................ | 10-2015-0129976 |
| Dec. 28, 2015 | (KR) | ........................ | 10-2015-0187986 |

(51) Int. Cl.
    *H04L 9/08*           (2006.01)
    *H04L 9/06*           (2006.01)

(52) U.S. Cl.
    CPC .............. *H04L 9/0872* (2013.01); *H04L 9/32* (2013.01); *H04L 9/3213* (2013.01); *H04L 63/0838* (2013.01)

(58) Field of Classification Search
    USPC ............................................................. 726/6
    See application file for complete search history.

(56) References Cited

U.S. PATENT DOCUMENTS

| | | | |
|---|---|---|---|
| 7,409,705 B2 | 8/2008 | Ueda | |
| 7,437,550 B2 | 10/2008 | Savage | |
| 7,904,946 B1* | 3/2011 | Chu | ...................... H04L 63/067 726/5 |
| 2004/0088578 A1 | 5/2004 | Chao | |
| 2004/0103325 A1* | 5/2004 | Priebatsch | .............. G06F 21/31 726/6 |
| 2008/0127317 A1 | 5/2008 | Nakhjiri | |
| 2009/0031125 A1* | 1/2009 | Bjorn | ................... H04L 9/0825 713/155 |
| 2009/0222896 A1 | 9/2009 | Ichikawa | |
| 2009/0313477 A1 | 12/2009 | Park | |
| 2009/0328168 A1 | 12/2009 | Lee | |
| 2010/0017859 A1 | 1/2010 | Kelly | |
| 2011/0113245 A1* | 5/2011 | Varadarajan | ............ G06F 21/34 713/168 |
| 2011/0173684 A1 | 7/2011 | Hurry | |
| 2011/0197070 A1* | 8/2011 | Mizrah | ............... H04L 63/0869 713/176 |
| 2011/0197266 A1* | 8/2011 | Chu | ...................... H04L 9/3228 726/5 |
| 2012/0066749 A1* | 3/2012 | Taugbol et al. | ......... G06F 21/40 726/6 |
| 2013/0139222 A1 | 5/2013 | Kirillin | |
| 2013/0185779 A1 | 7/2013 | Tamai | |
| 2014/0281506 A1* | 9/2014 | Redberg | ................ H04L 63/067 713/159 |
| 2014/0365780 A1 | 12/2014 | Movassaghi | |
| 2015/0365402 A1 | 12/2015 | Woo | |

FOREIGN PATENT DOCUMENTS

| | | |
|---|---|---|
| KR | 10-2013-0060249 A | 6/2013 |
| KR | 10-2014-0106360 A | 9/2014 |
| WO | 2008/105602 A1 | 9/2008 |

OTHER PUBLICATIONS

International Search Report for PCT/KR2016/000951 dated Sep. 22, 2016 from Korean Intellectual Property Office.

* cited by examiner

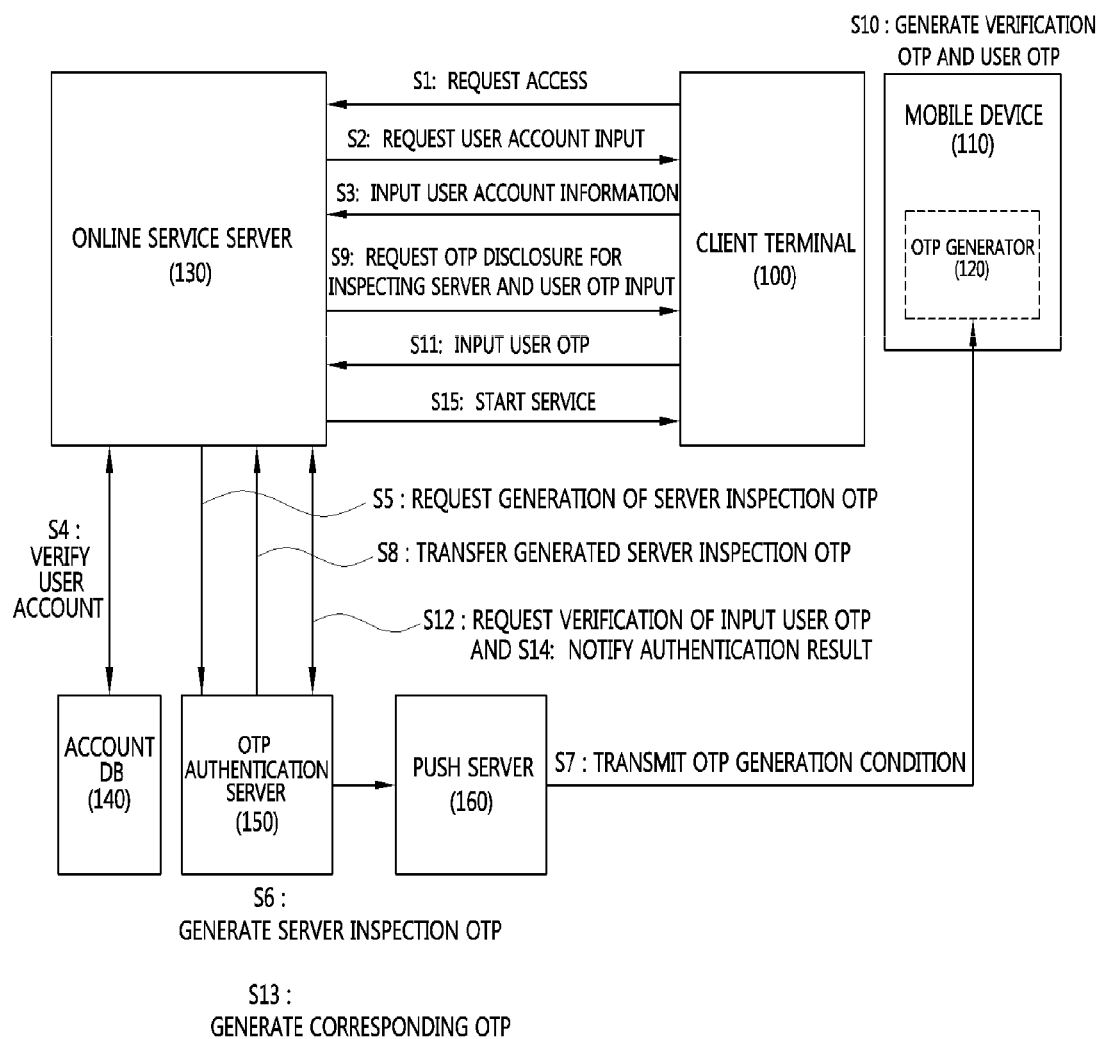

[FIG. 2]
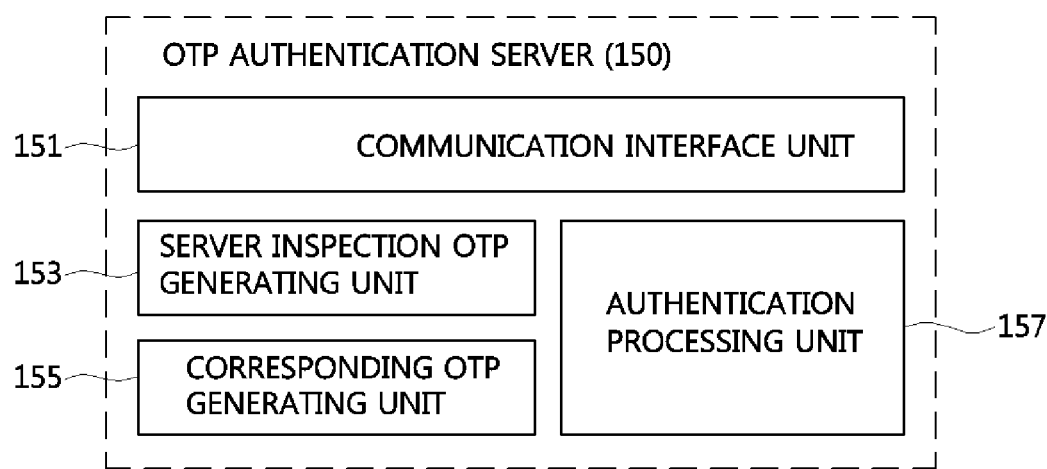
[FIG. 3]
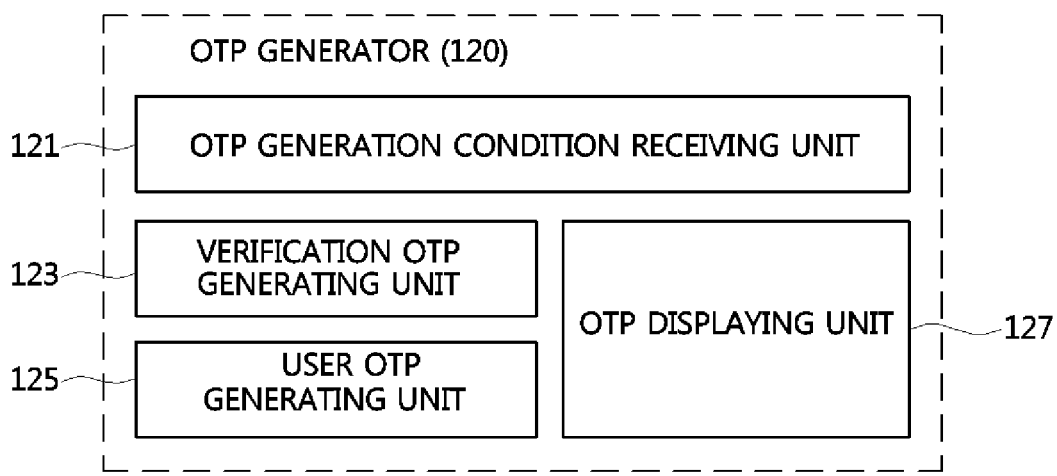

[FIG. 4]
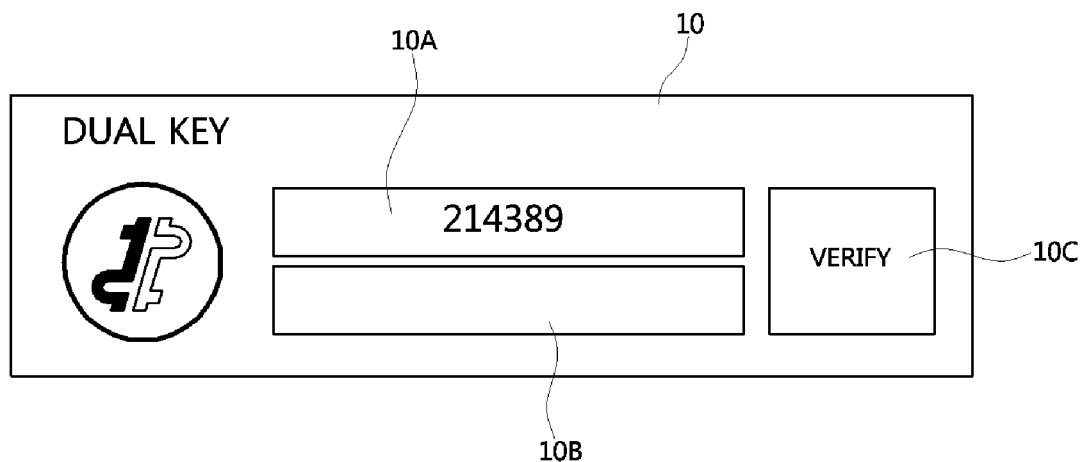
[FIG. 5]
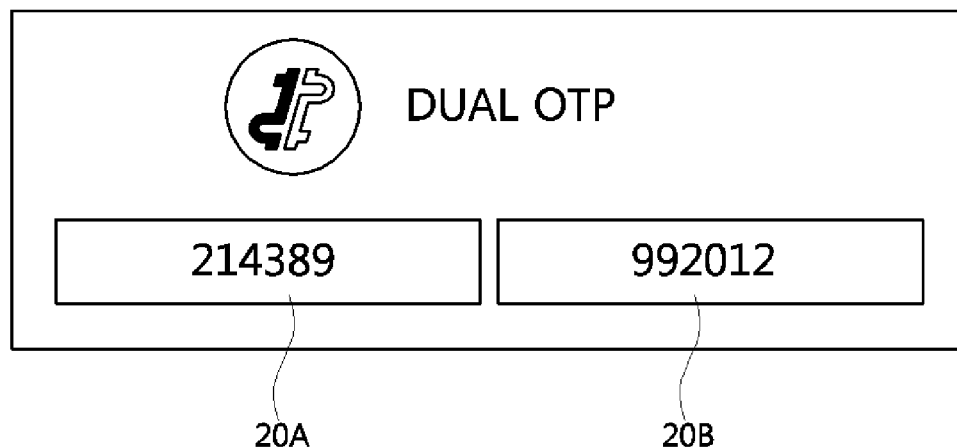

[FIG. 6]
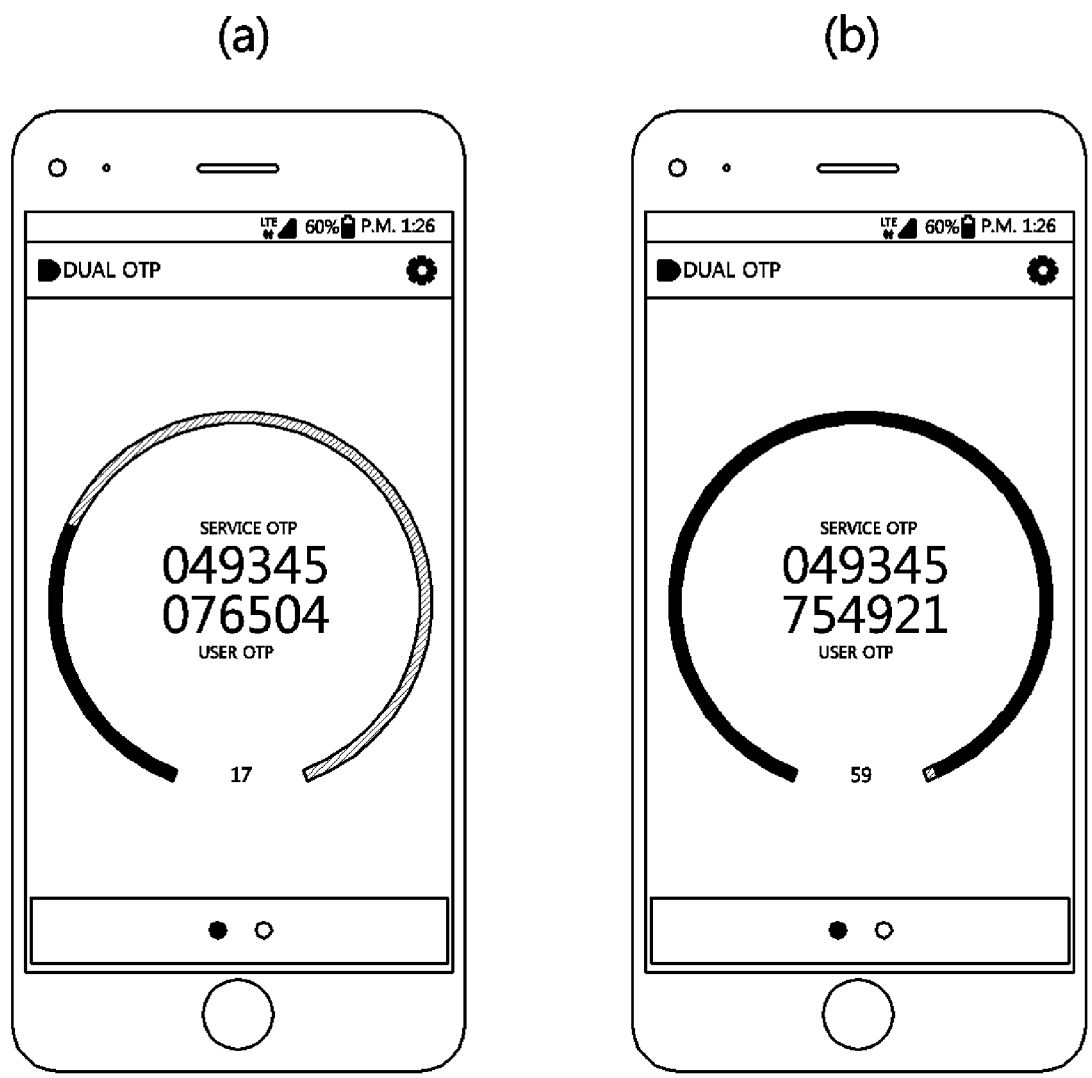

[FIG. 7]
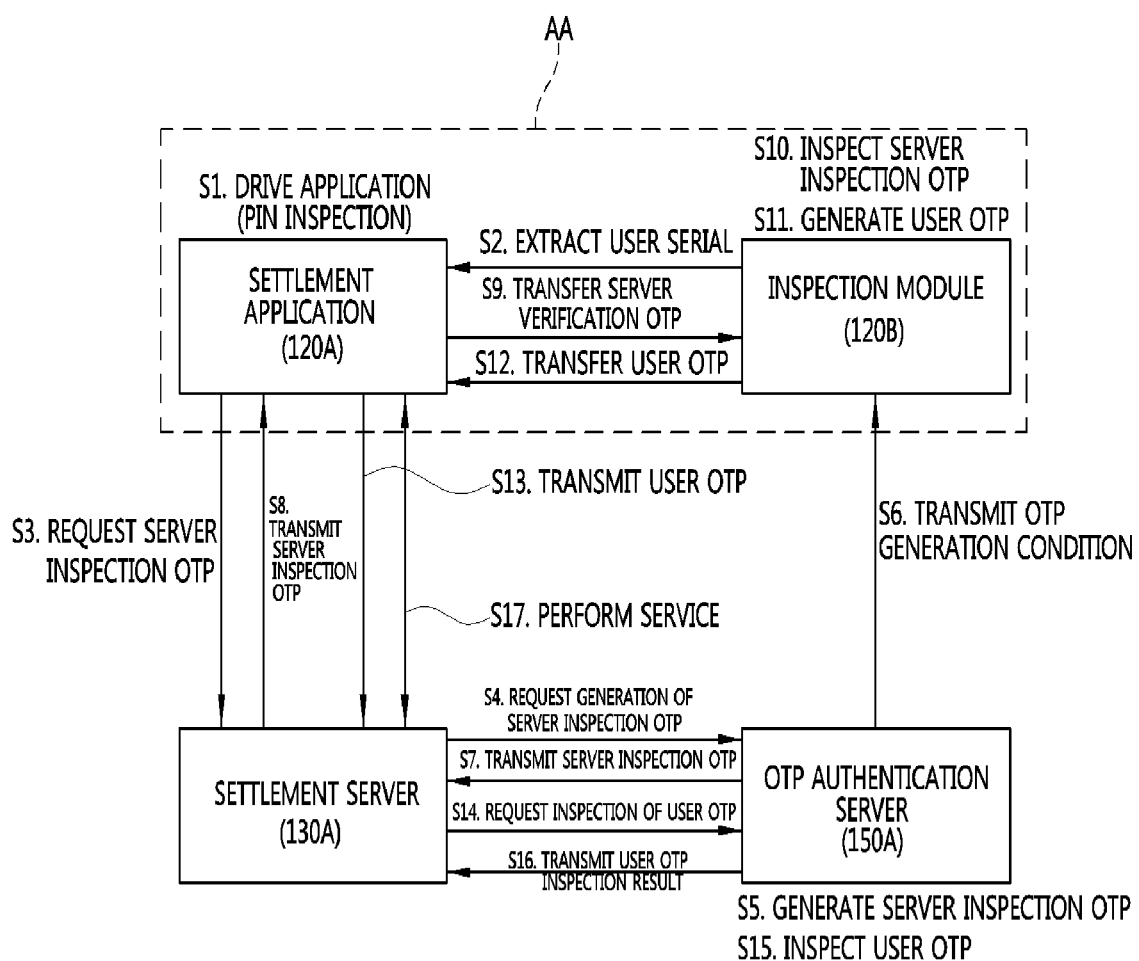

[FIG. 8]
(a)
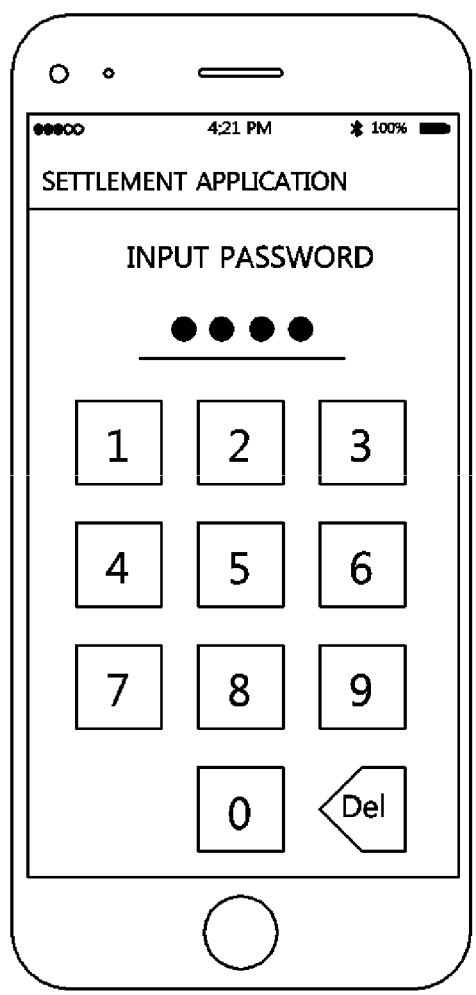
(b)
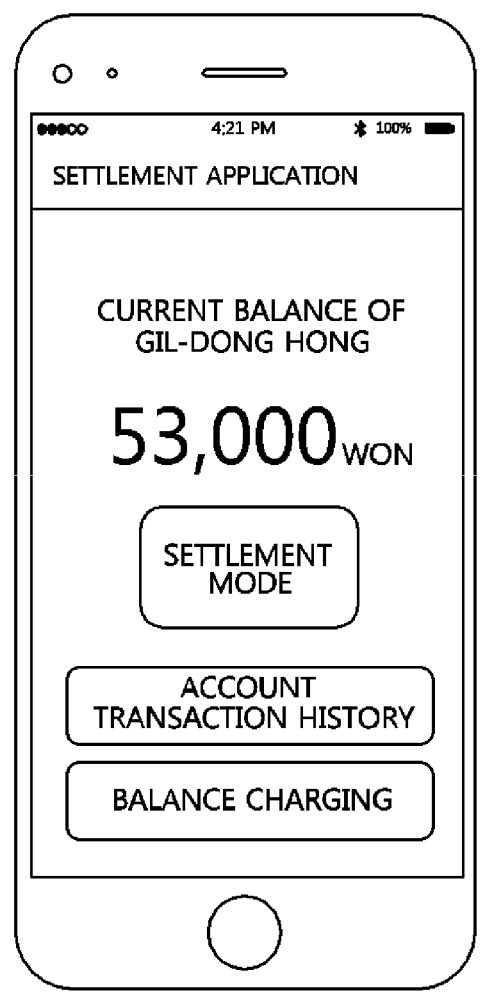

[FIG. 9]
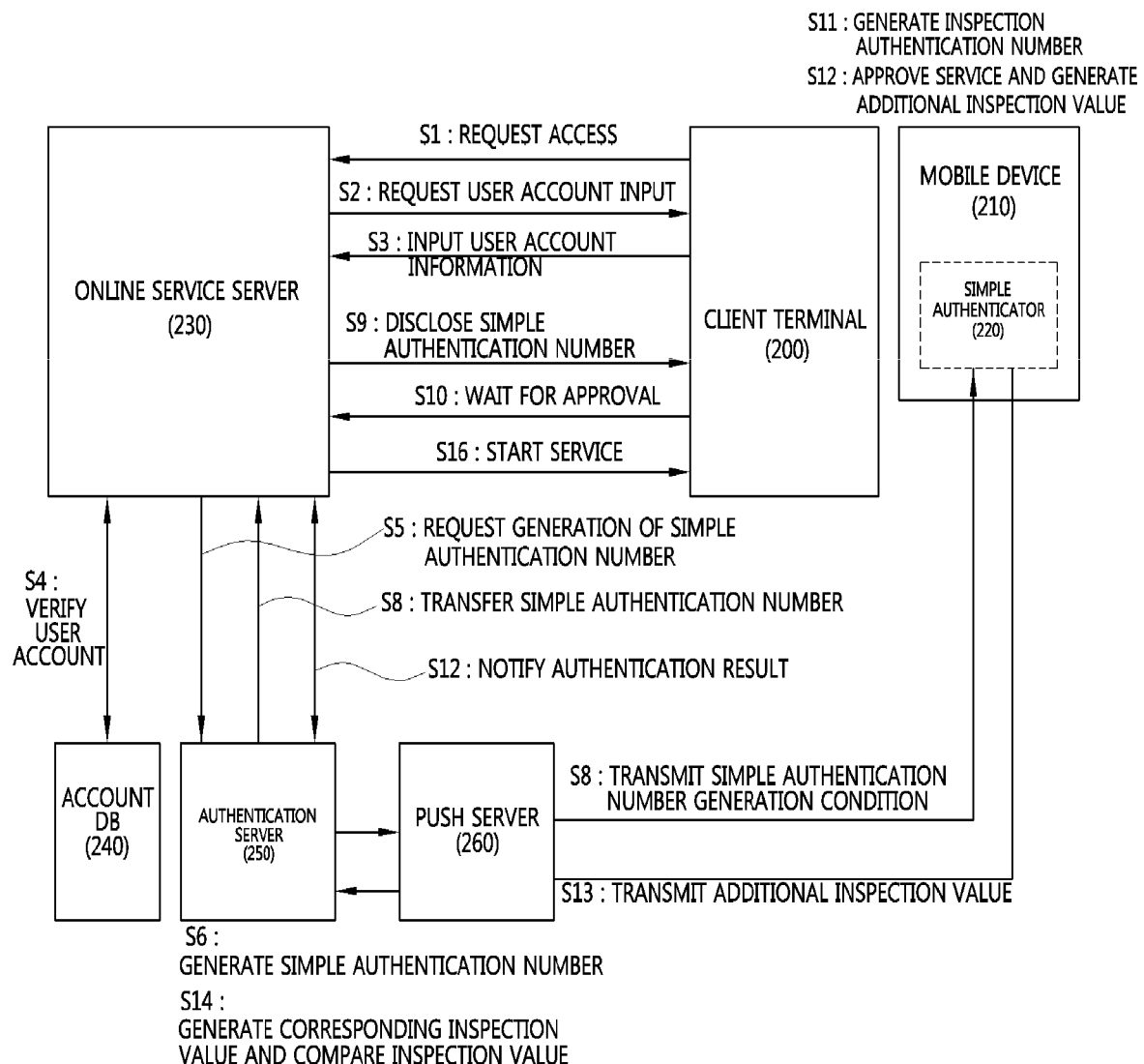

[FIG. 10]
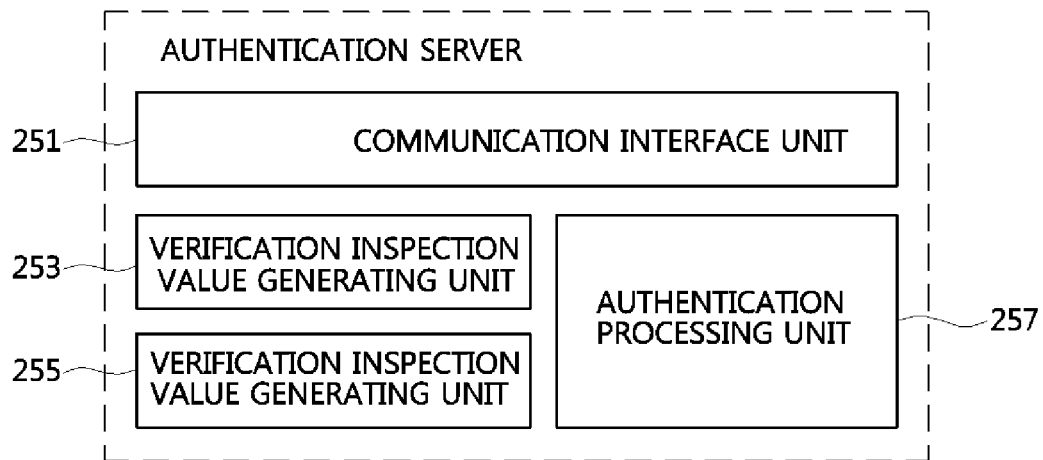
[FIG. 11]
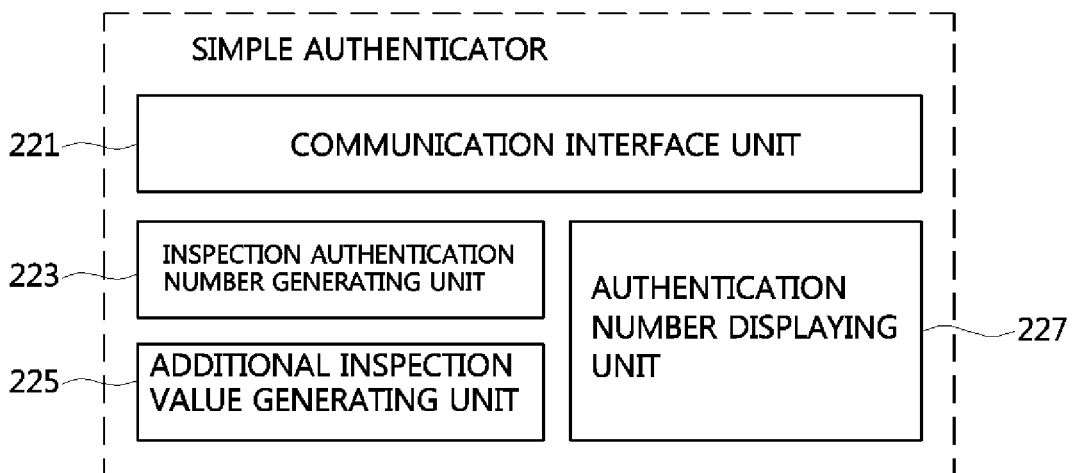

[FIG. 12]
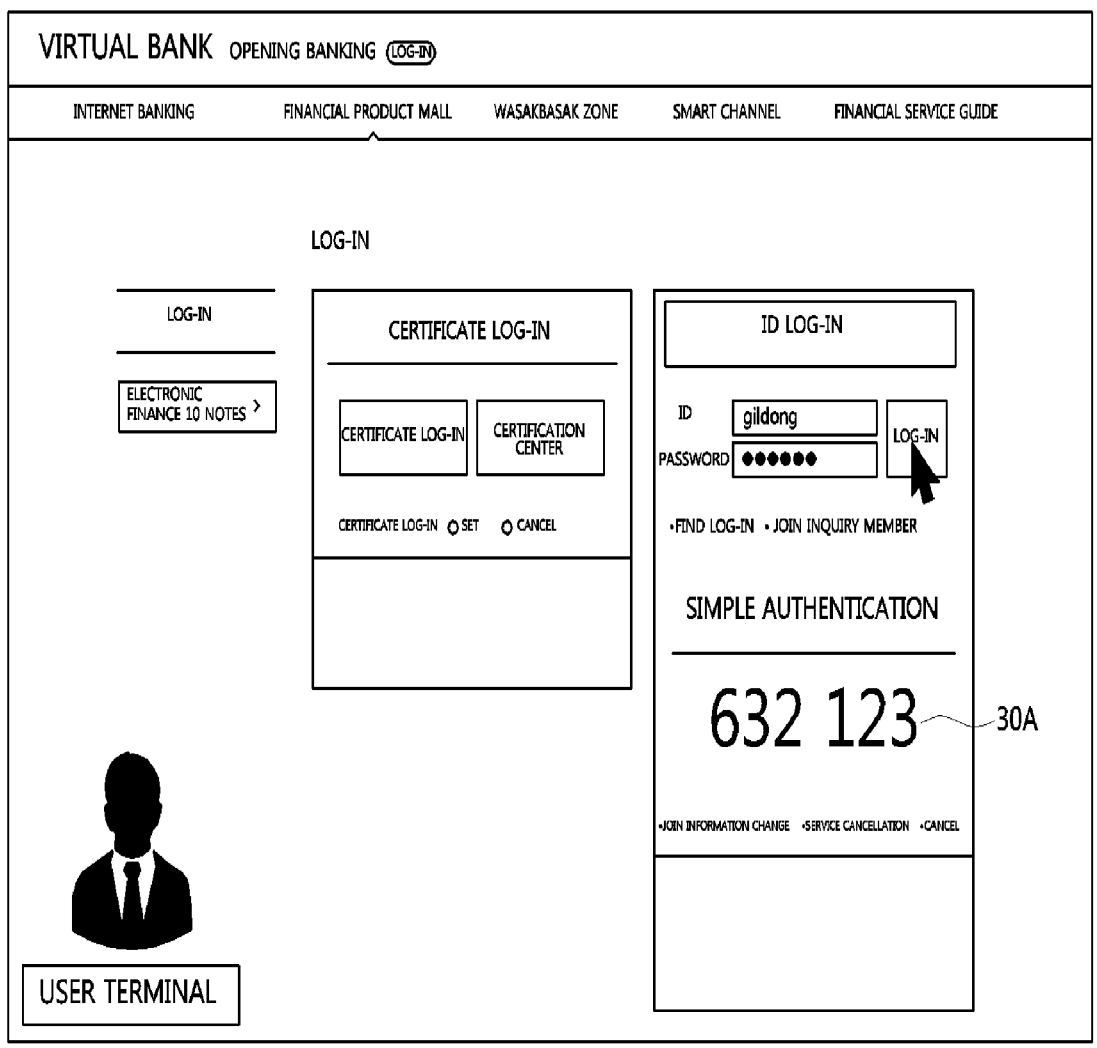

[FIG. 13]
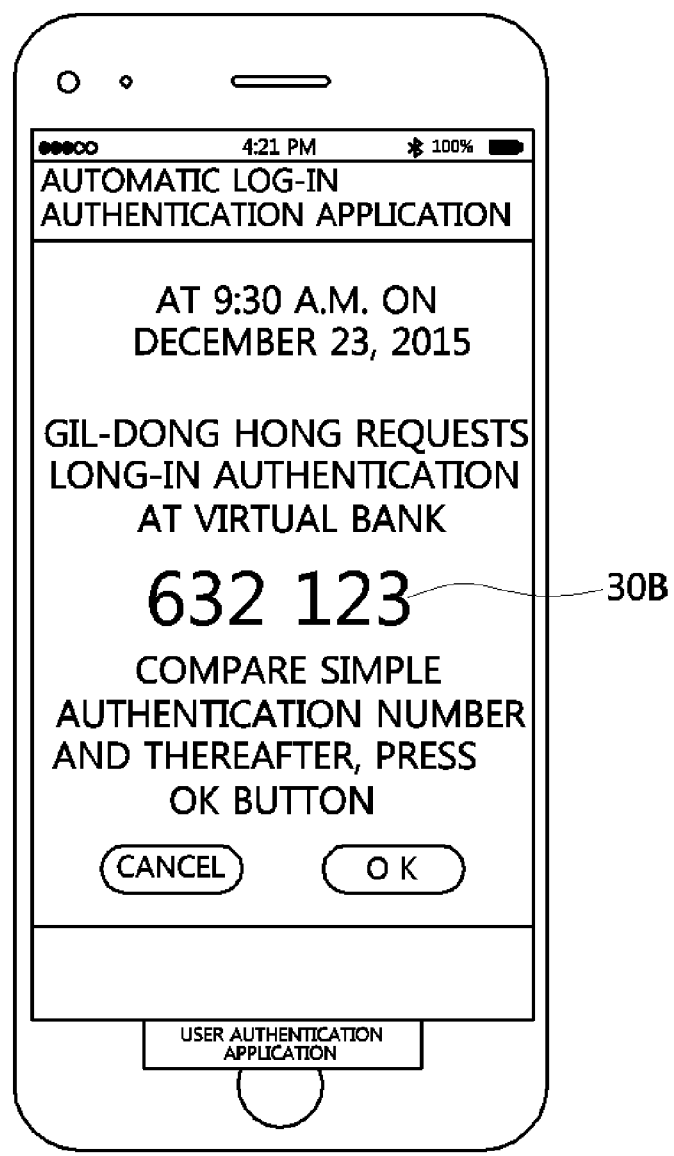

[FIG. 14]
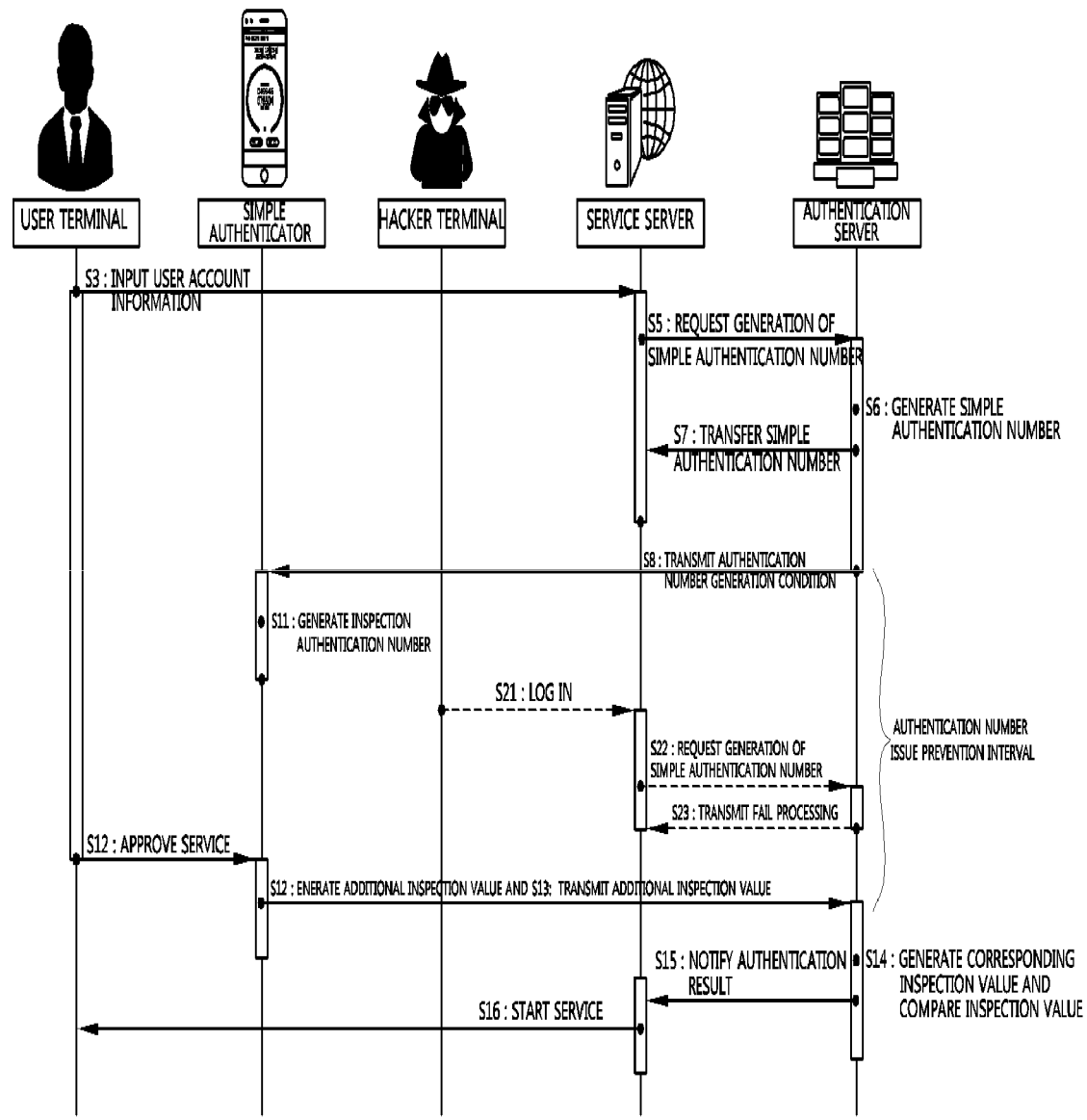

[FIG. 15]
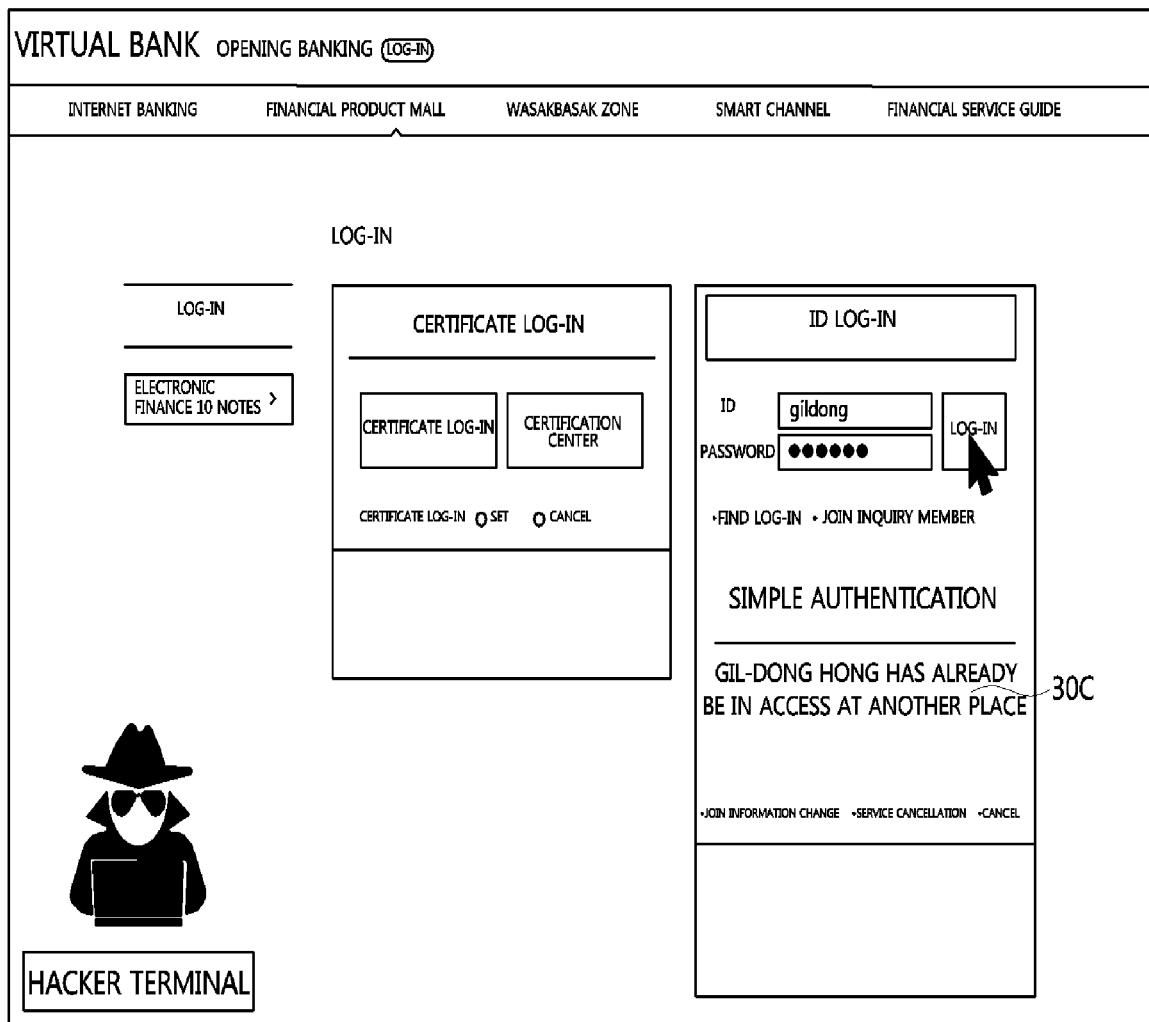

[FIG. 16]
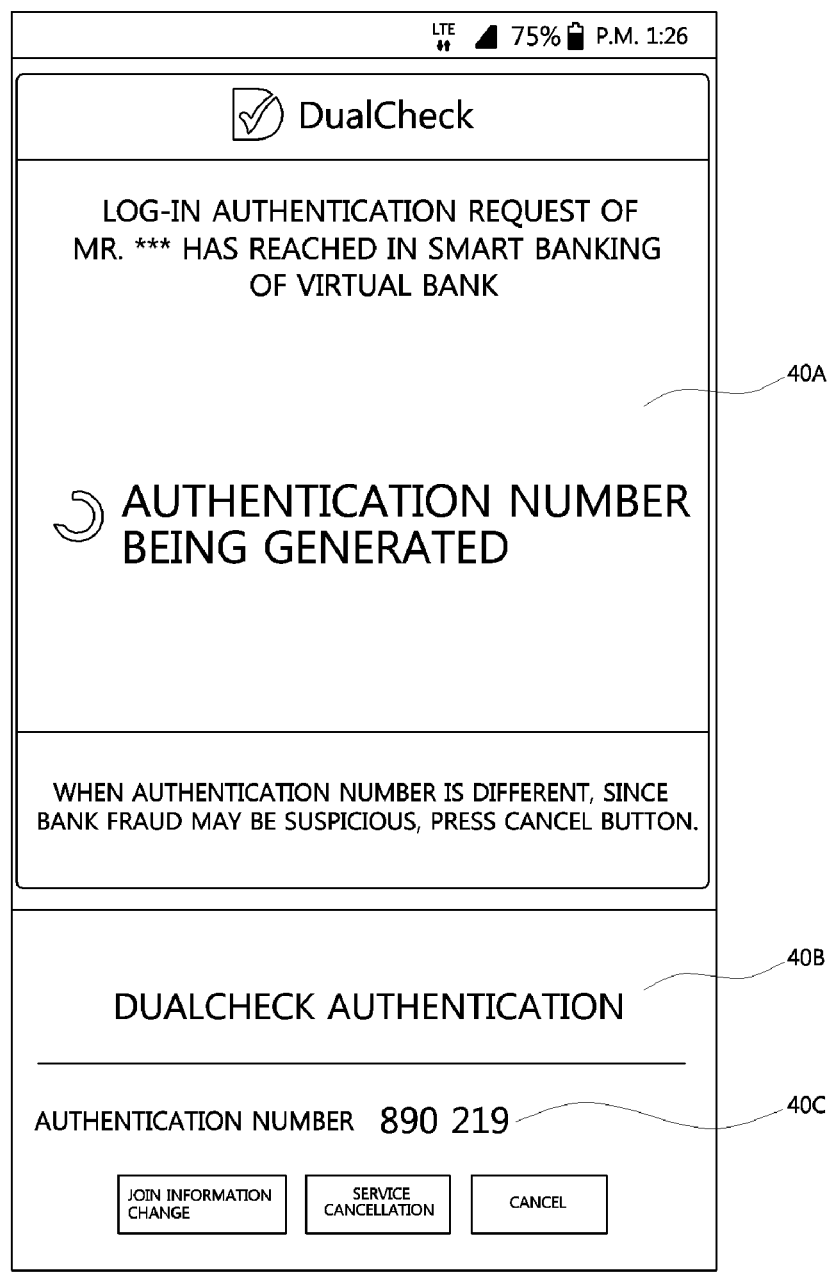

[FIG. 17]
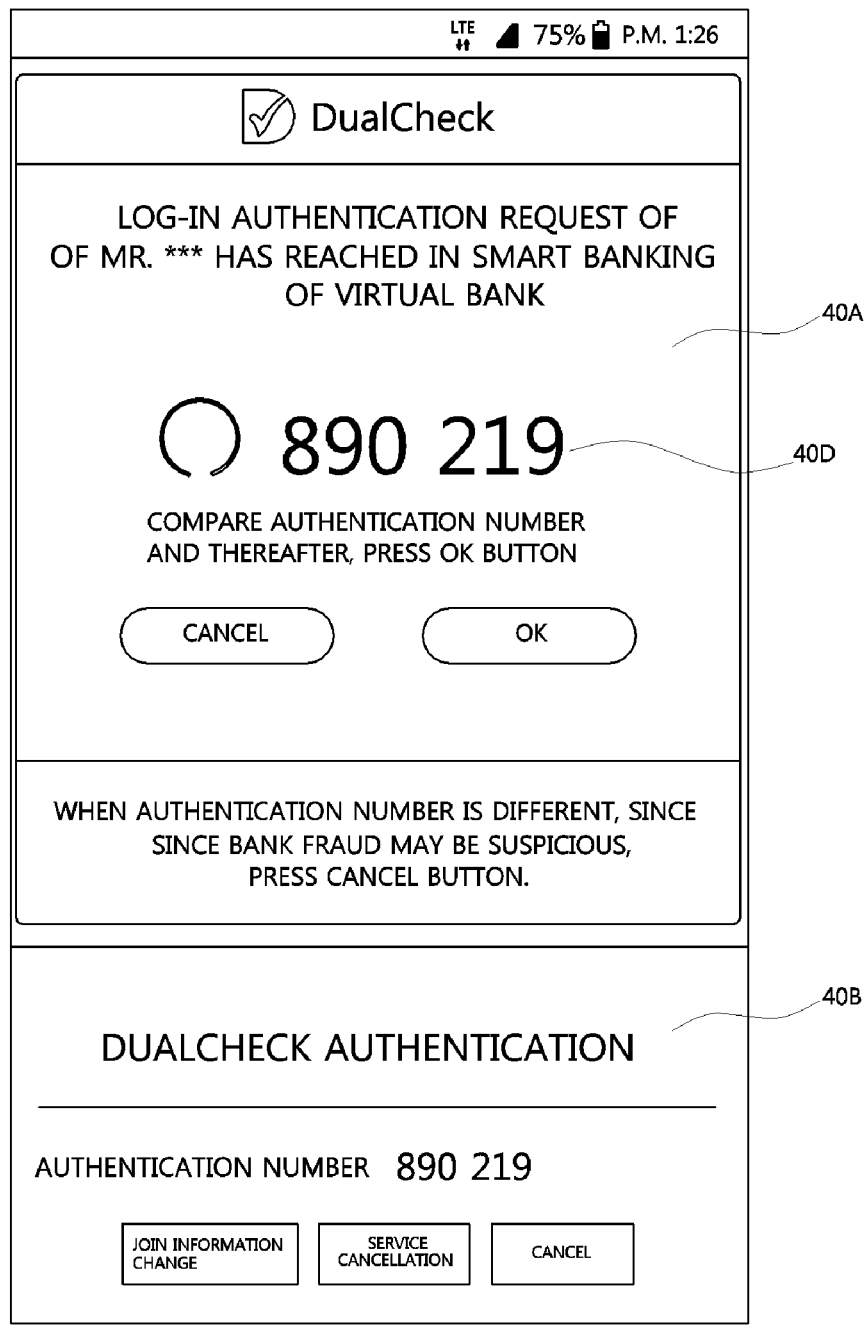

[FIG. 18]
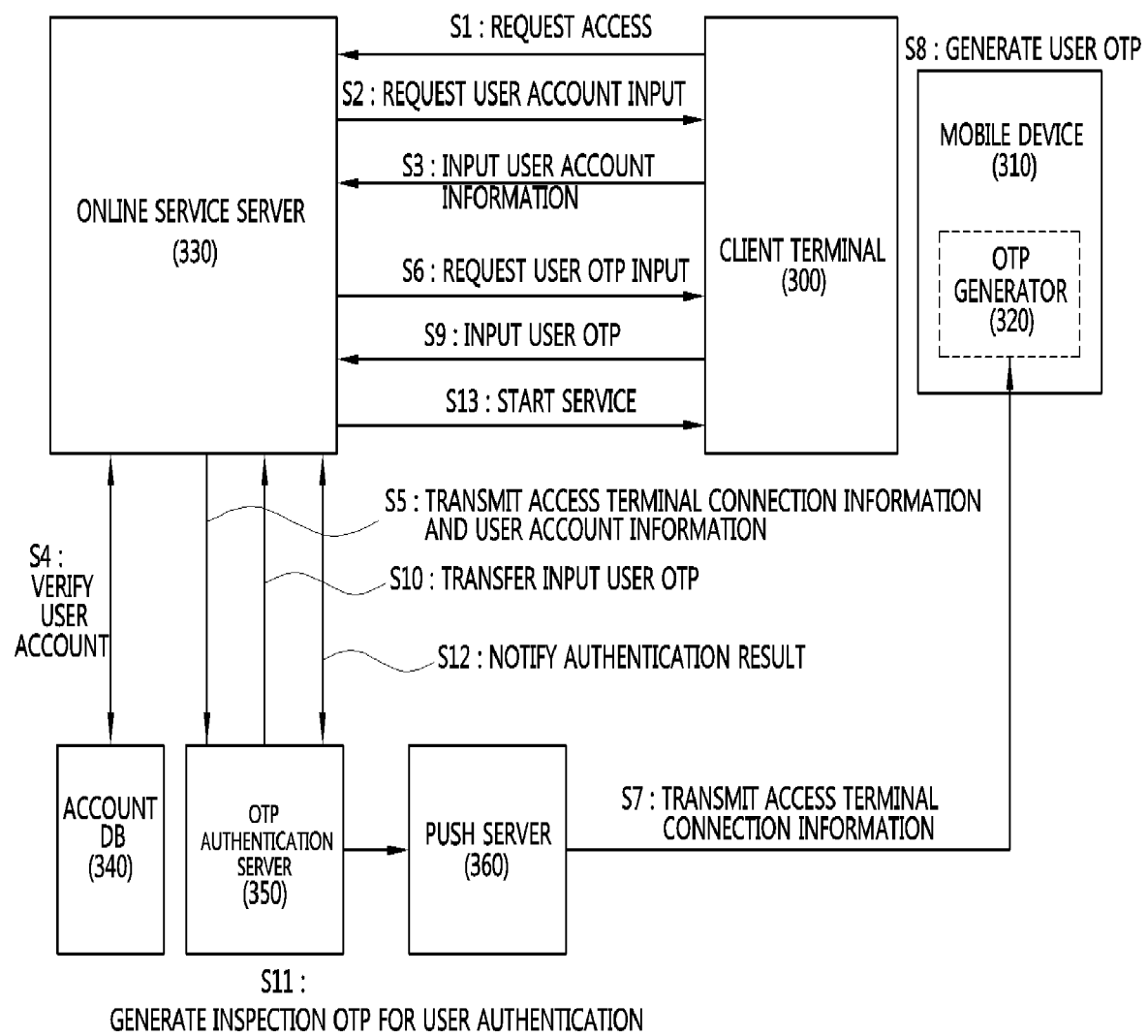

[FIG. 19]
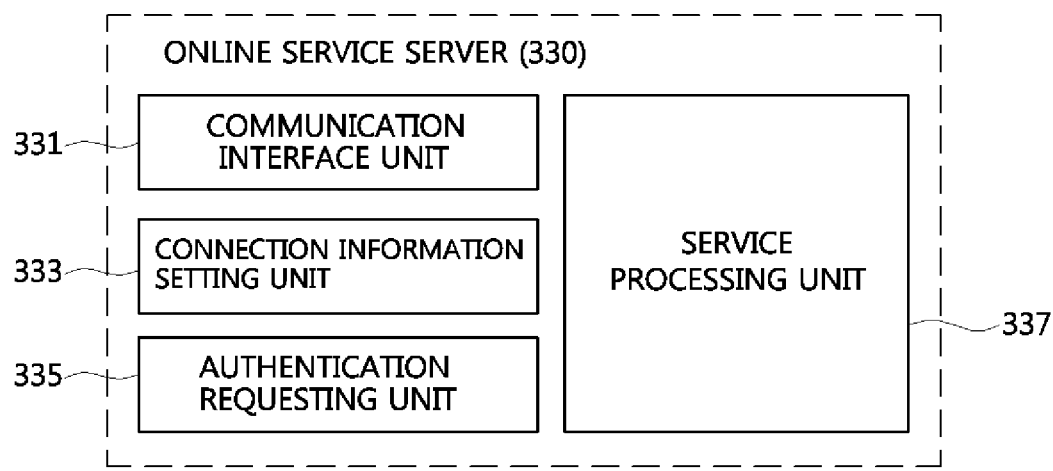
[FIG. 20]
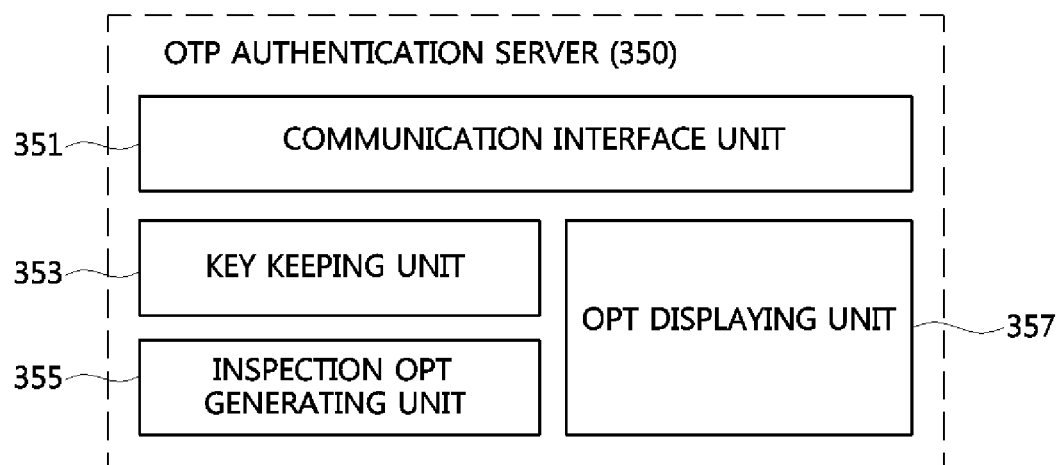

[FIG. 21]
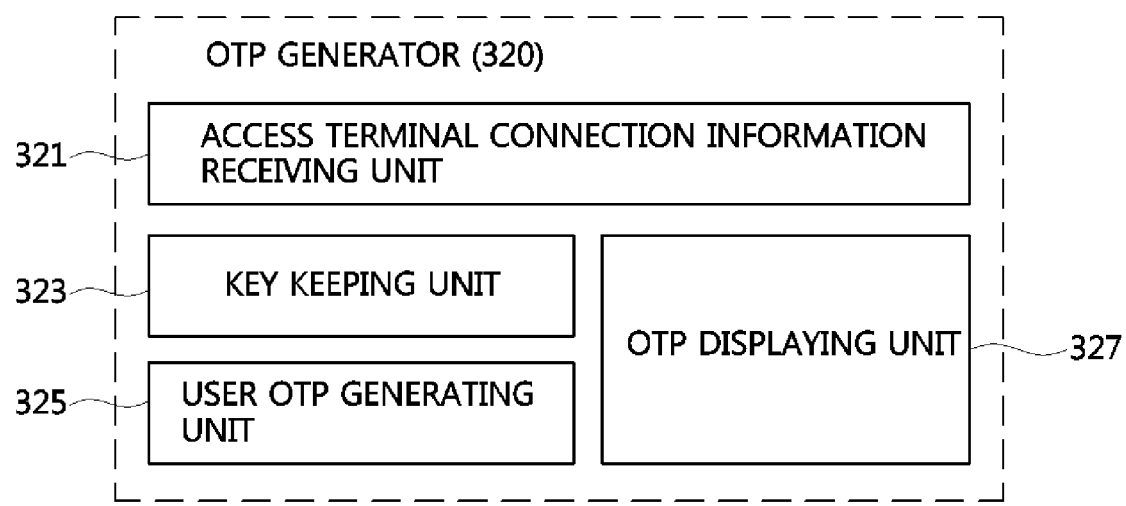

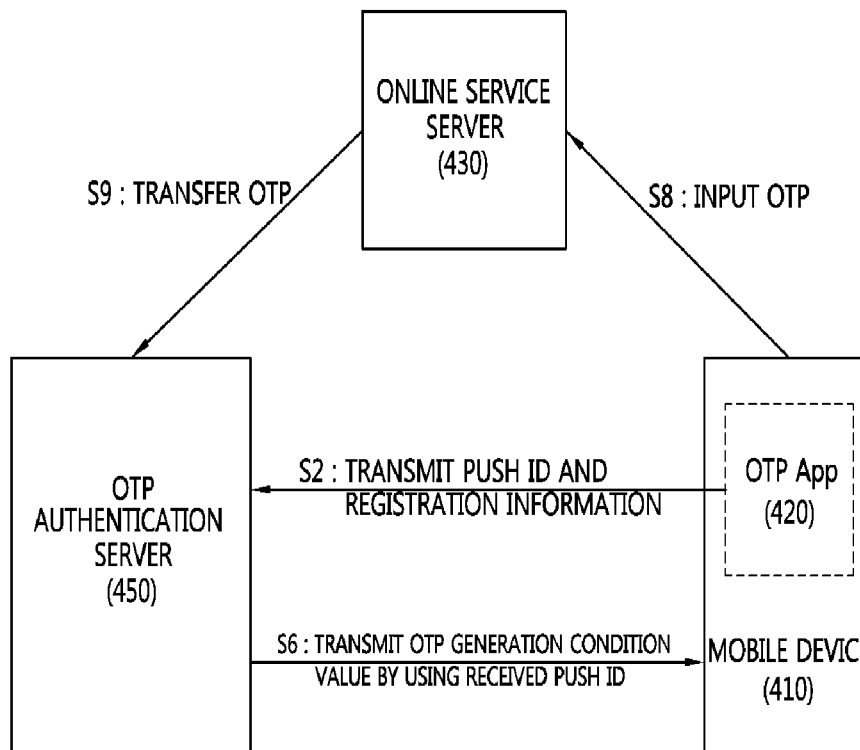
[FIG. 22]

[FIG. 23]
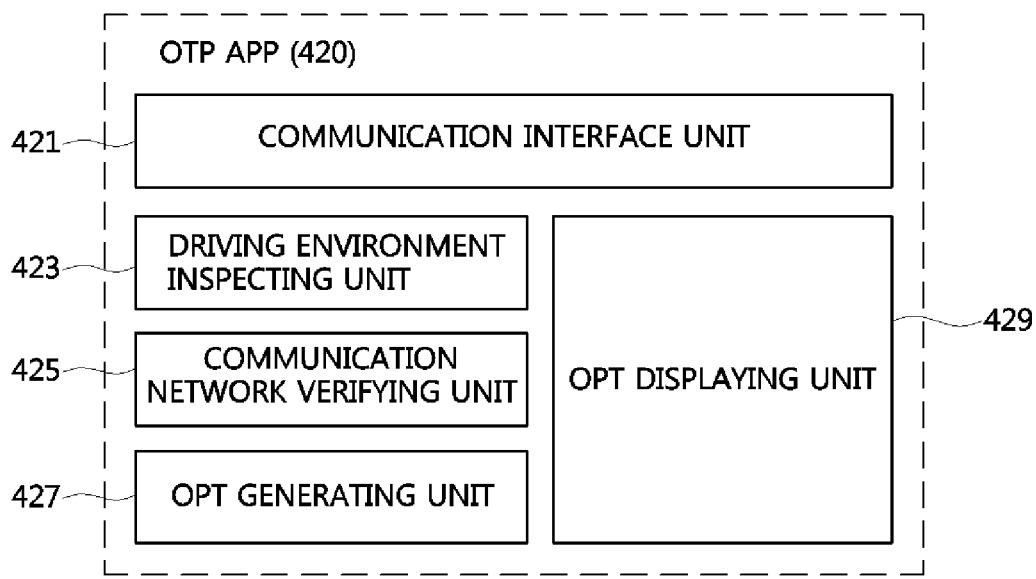
[FIG. 24]
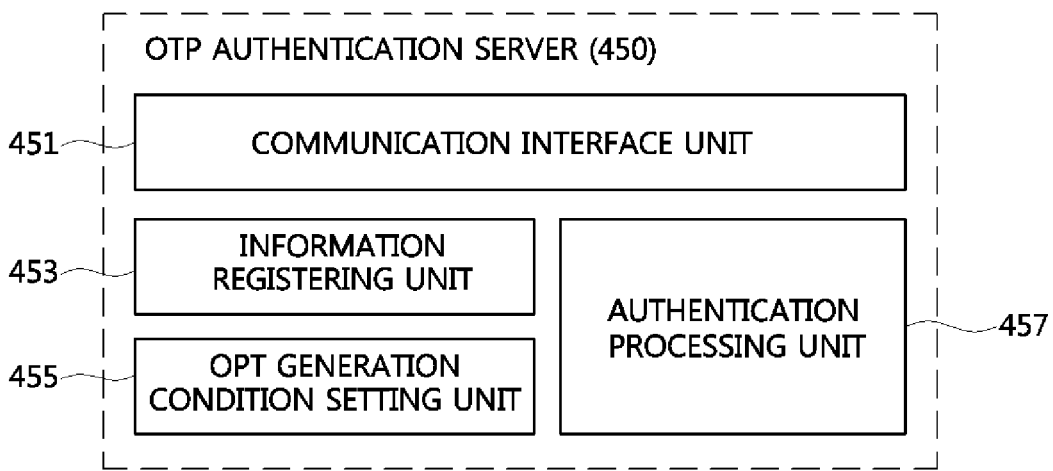

[FIG. 25]
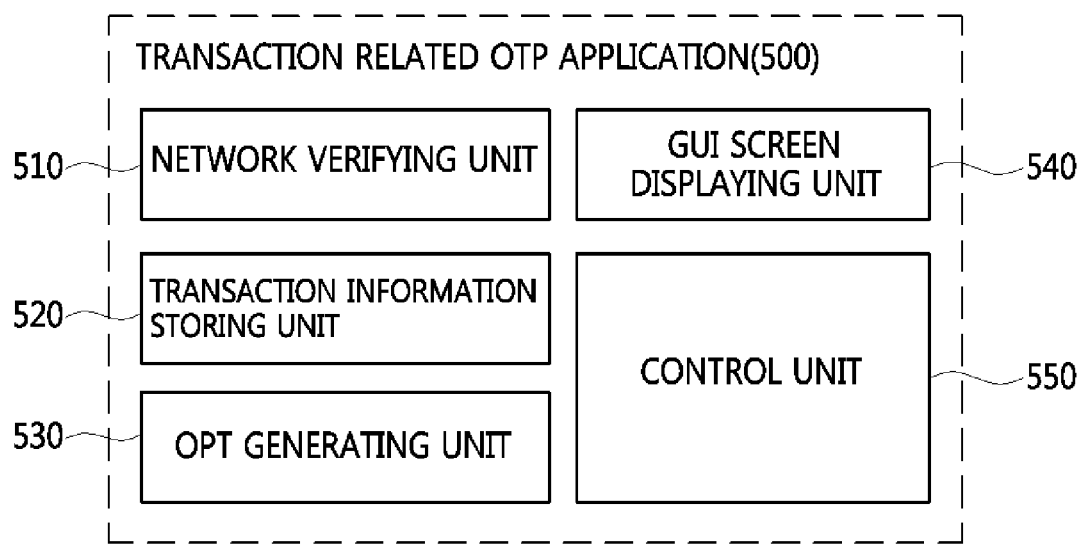

[FIG. 26]
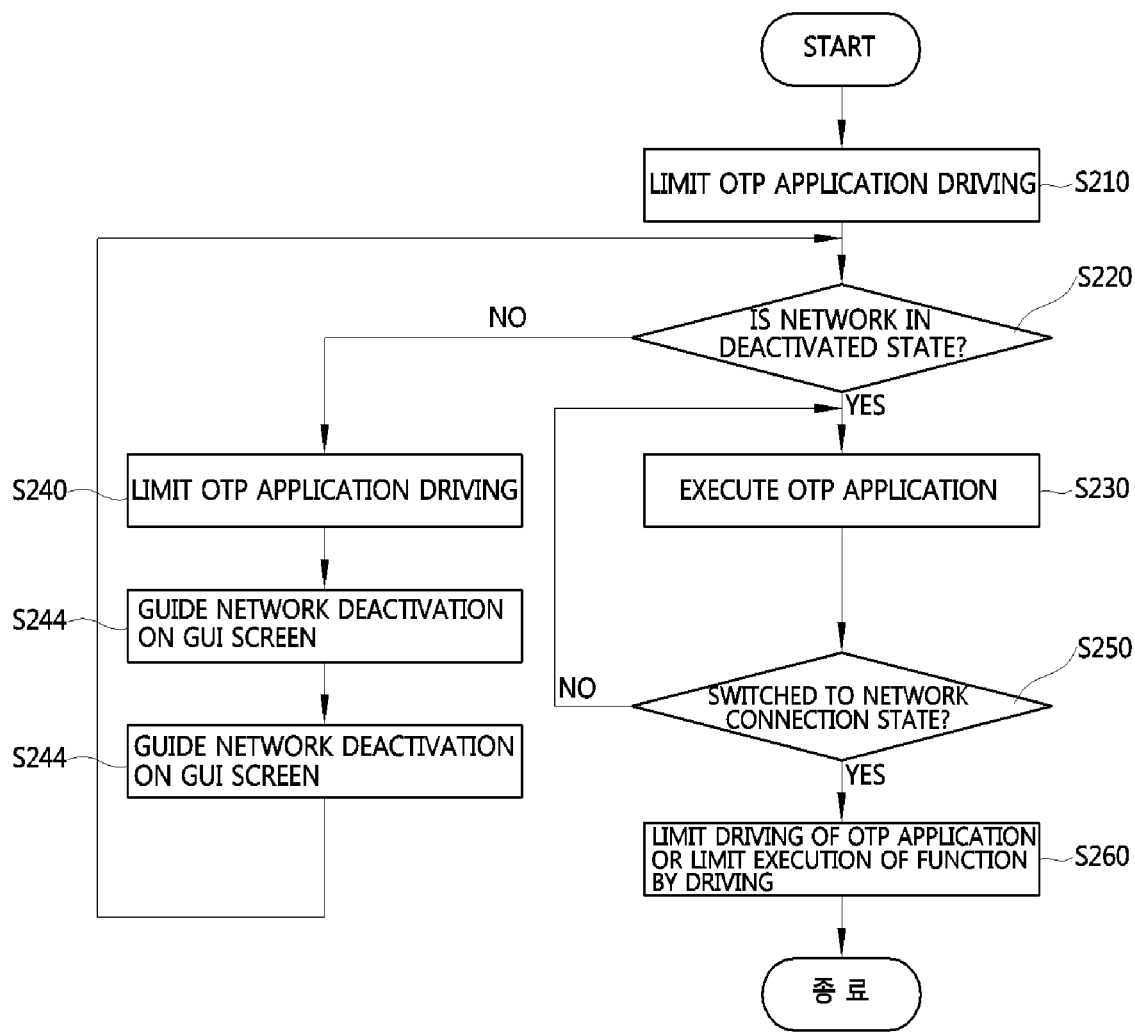

[FIG. 27]
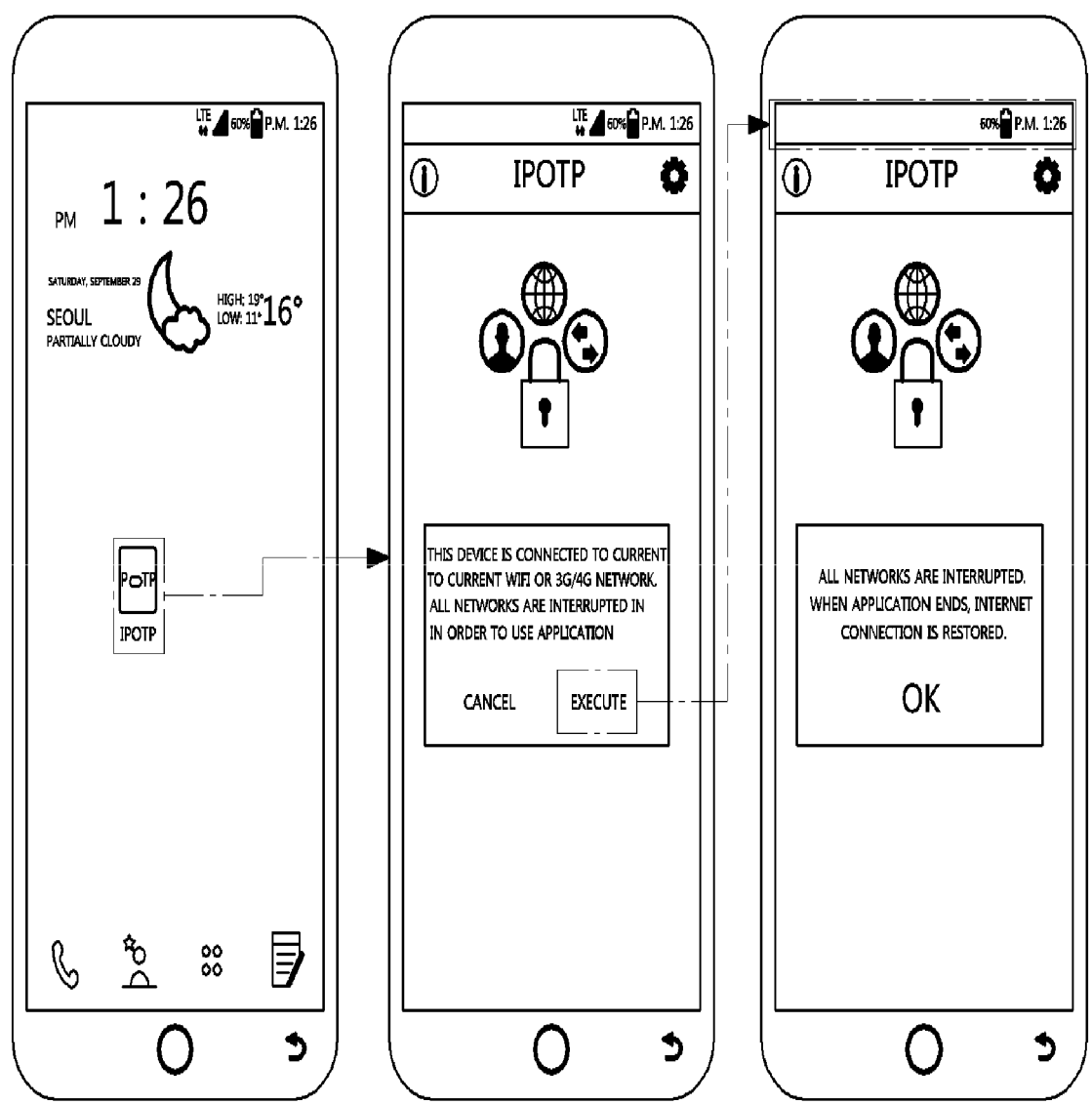

[FIG. 28]
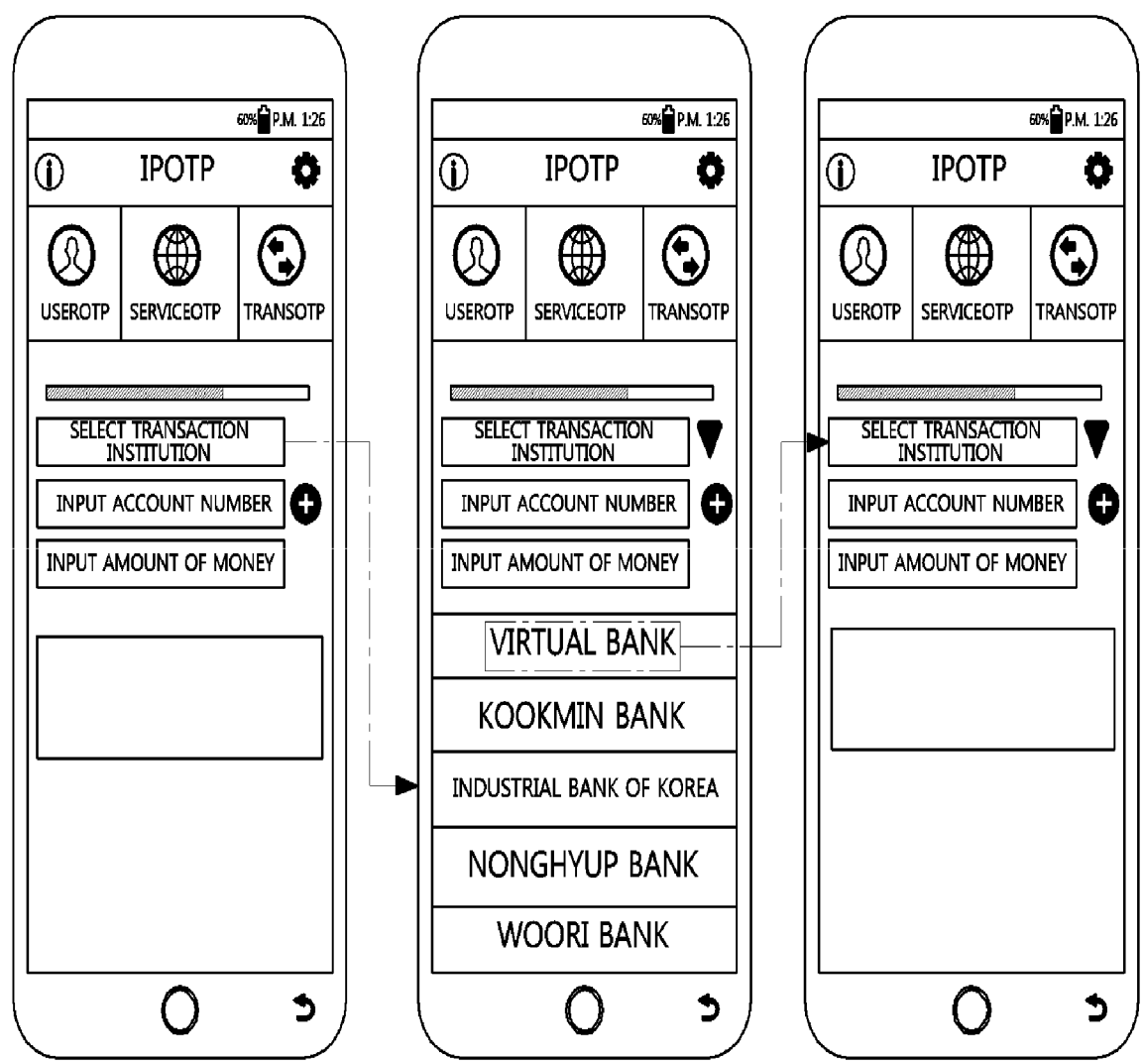

[FIG. 29]
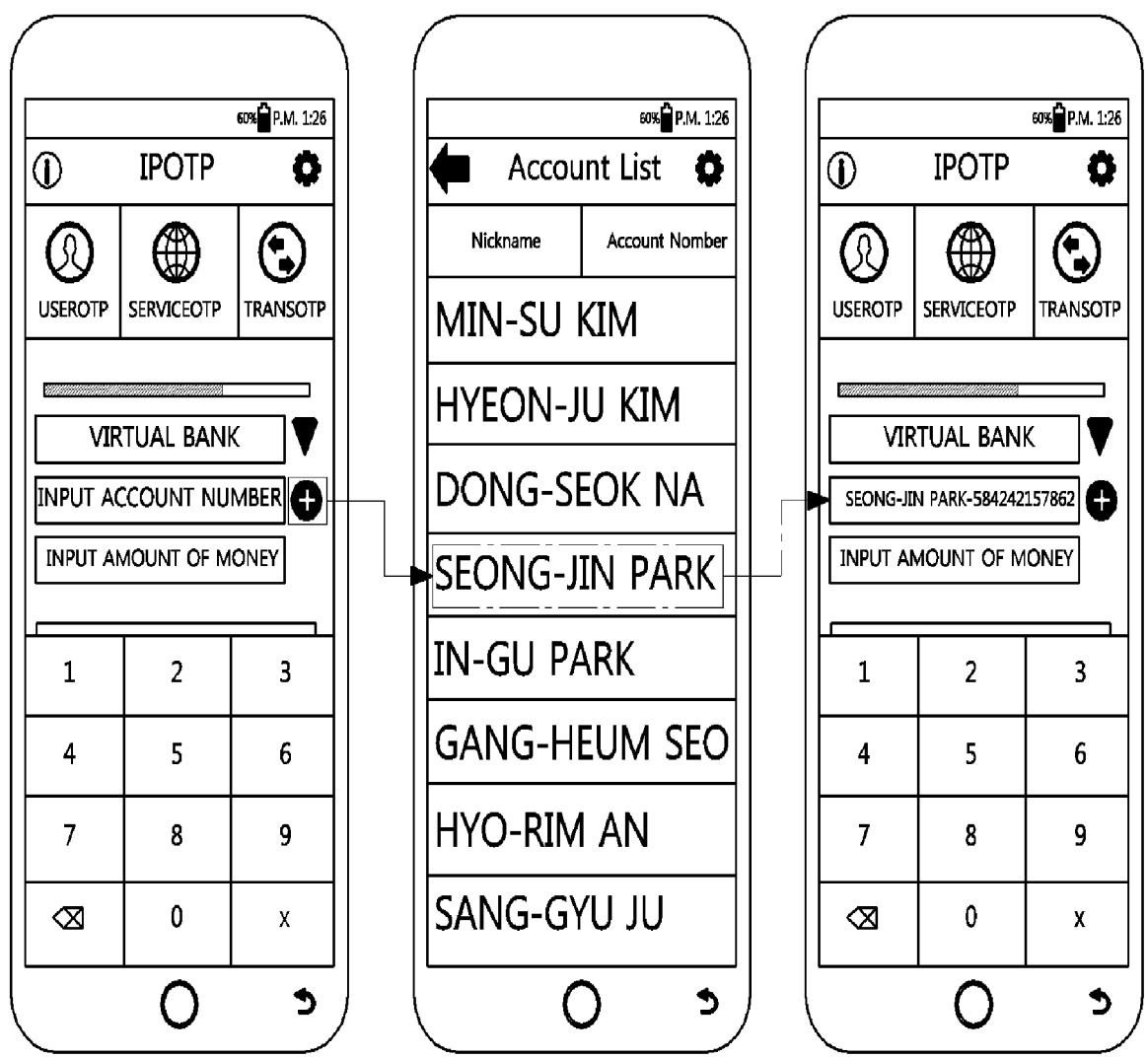

[FIG. 30]
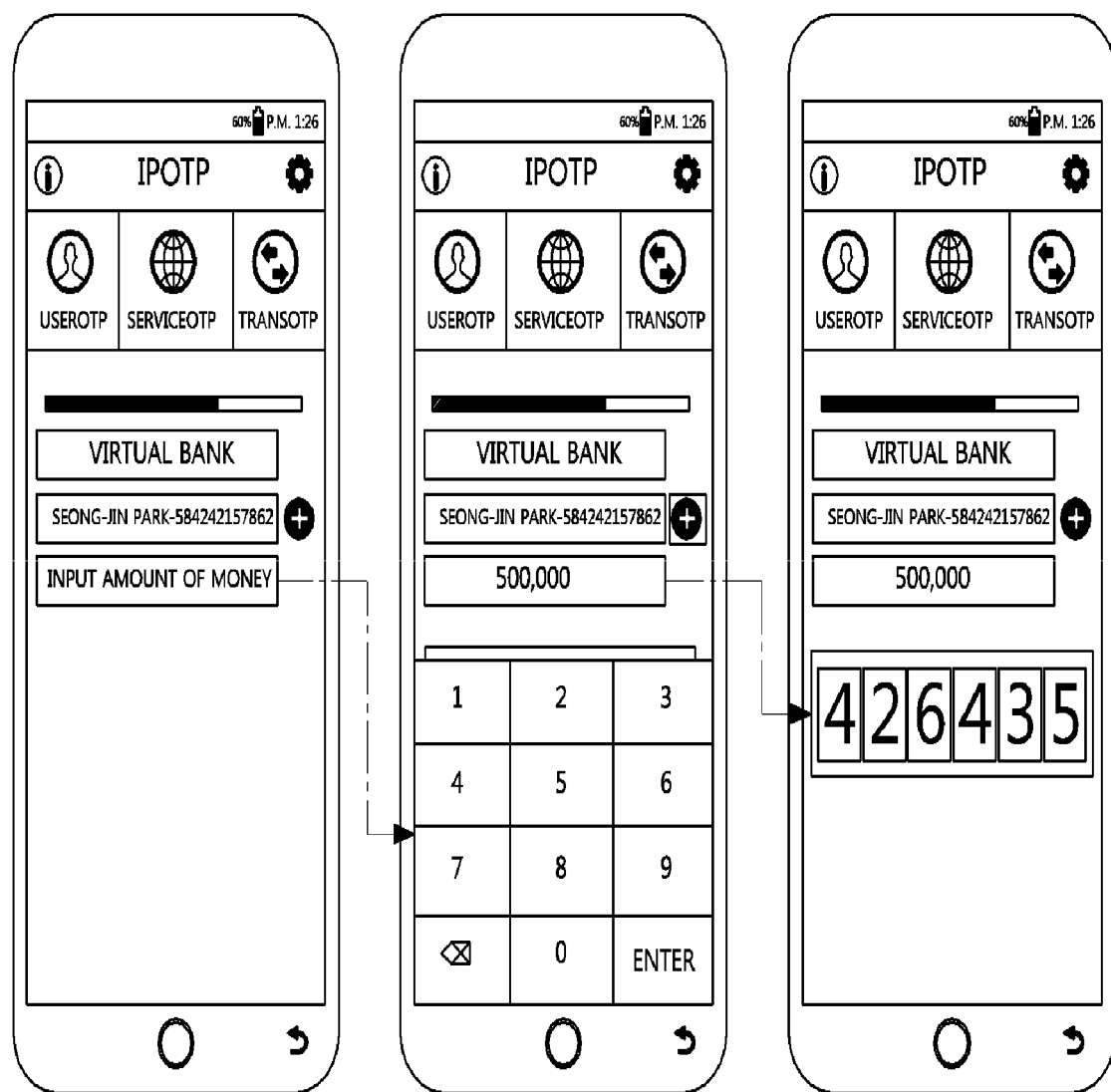

[FIG. 31]
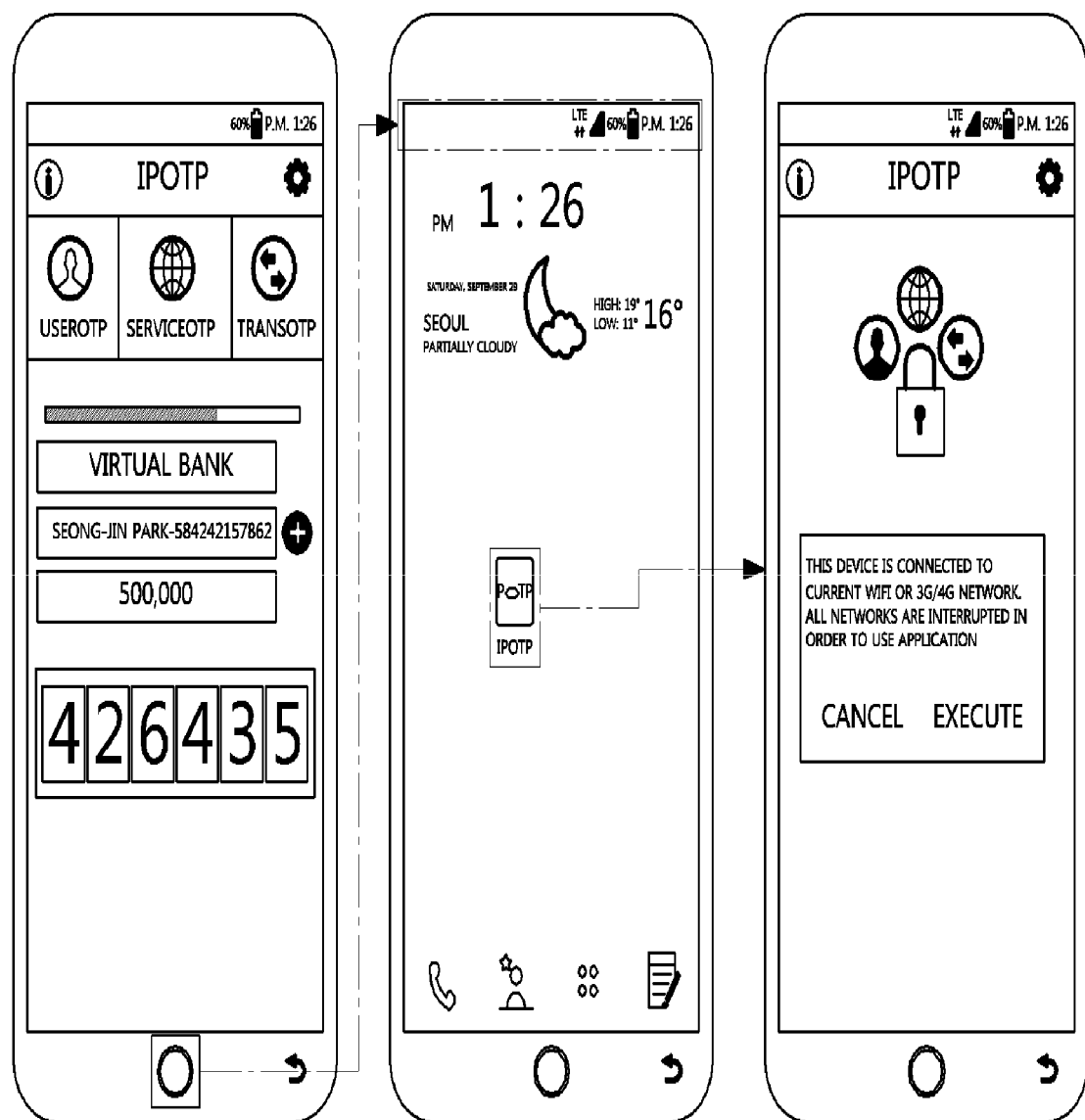

AUTHENTICATION METHOD AND SYSTEM

CROSS REFERENCE TO PRIOR APPLICATION

This application is a Continuation Application of U.S. patent application Ser. No. 15/540,035 filed on Jun. 27, 2017 under 35 U.S.C. § 120, which is a National Stage Application of PCT International Patent Application No. PCT/KR2016/000951 filed on Jan. 28, 2016, under 35 U.S.C. § 371, which claims priority to Korean Patent Application Nos. 10-2015-0018752 filed on Feb. 6, 2015, 10-2015-0062552 filed on May 4, 2015, 10-2015-0074949 filed on May 28, 2015, 10-2015-0129976 filed on Sep. 14, 2015 and 10-2015-0187986 filed on Dec. 28, 2015, which are all hereby incorporated by reference in their entirety.

BACKGROUND

The present invention relates to an authentication system, and more particularly, to a method and a system of authentication using a one time password (OTP), and the like.

In recent years, in a place requiring financial transaction or confidentiality, the use of a one time password (OTP) which is a disposable password as an authentication method has been spread. Conventionally, the OTP is divided into a hardware based dongle scheme and a software application scheme of a user terminal according to a driving scheme. The hardware dongle scheme is characterized in that an effect of security is high, but carrying is inconvenient and cost is generated and the software scheme is advantageous in that the security effect is slightly lower, but the cost is low.

Accordingly, a new authentication method and a new authentication system are required, which can a danger of information capturing which is increasingly advanced by a hacker with both the advantage of the hardware dongle scheme and the advantage of the software application scheme.

The present invention has been made in an effort to provide a method and a system of authentication using a one time password (OTP), and the like, which have enhanced security.

SUMMARY

According to an aspect of the present invention, provided are a method and a system of authentication, which have enhanced security.

According to a first embodiment of the present invention, a computer implemented method for performing mutual authentication between an online service server and a service user includes the steps of:

(a) generating, by an authentication server, a server inspection OTP according to a server inspection OTP generation request;

(b) generating, by an OTP generator, a verification OTP having the same condition as the server inspection OTP in order to verify whether the online service server is true and using the same generation key as an OTP generation key used for generating the server inspection OTP and a calculation condition different from a calculation condition used for generating the server inspection OTP is applied or a generation key different from the OTP generation key used for generating the server inspection OTP is used and the same calculation condition as the calculation condition used for generating the server inspection OTP is applied to generate a user OTP having a value paired with the server inspection OTP; and (c) generating, by the authentication server, when a user authentication request including the user OTP is received from the online service server, a corresponding OTP having the same condition as the user OTP and comparing whether the generated corresponding OTP and the user OTP match each other to authenticate the service user.

According to a second embodiment of the present invention, a computer implemented method for performing mutual authentication between an online service server and a service user includes the steps of:

(a) generating, by an authentication server, a simple authentication number as receiving a simple authentication generation request including user account information of the service user accessing the online server from the online server;

(b) transmitting, by the authentication server, a generation condition used for generating the simple authentication number a simple authenticator of a user corresponding to the user account information;

(c) generating, by the simple authenticator, an inspection authentication number corresponding to the simple authentication number by using the generation condition of the simple authentication number; and (d) generating, by the authentication server, a corresponding inspection value to correspond to an additional inspection value transferred from the simple authenticator as inspection of the online service server through the simple authentication number and the inspection authentication number is completed and comparing whether the additional inspection value and the corresponding inspection value match each other to authenticate the corresponding service user.

According to a third embodiment of the present invention, a computer implemented method for authenticating a service user accessing an online service server includes the steps of:

receiving, by an authentication server, access terminal connection information of the service user accessing the online service server from the online service server, wherein the access terminal connection information is server-terminal connecting information generated and managed by the online service server in order to manage consecutive data transmission/reception between the online service server and an access terminal of the service user;

generating, by an OTP generator of the service user, a user OTP by using the access terminal connection information when the access terminal connection information is received from the authentication server; and generating, by the authentication server, an inspection OTP for authenticating the service user by using the access terminal connection information and comparing whether the generated inspection OTP and the user OTP transferred from the online service server match each other to authenticate the service user.

According to a fourth embodiment of the present invention, a computer implemented method for inspecting a driving environment in which a one time password (OTP) application is driven, wherein, the OTP application is a software type OTP generator which is installed in a mobile device to generate an OTP, includes the steps of:

(a) receiving, by an authentication server, a push ID and basic registration information of the OTP application from the OTP application as the OTP application is driven;

(b) verifying, by the authentication server, whether the received push ID and basic registration information and a push ID and basic registration information which are previously kept match each other; and (c) transmitting, by the authentication server, an OTP generation condition value to the OTP application when the information verified in step (b) matches.

According to a fifth embodiment of the present invention, a computer implemented method for a one time password (OTP) application executed by a user terminal, includes the steps of:

verifying a network connection state of the user terminal when a driving request for the OTP application is received; and controlling the OTP application to be driven when the network connection is in a deactivated state according to a verification result of the network connection state.

Further, a computer implemented method for a one time password (OTP) application executed by a user terminal, includes the steps of:

verifying a network connection state of the user terminal when the OTP application is being driven; and controlling at least one of driving of the OTP application and performing of a function depending on the driving to be limited when the network connection is made according to a verification result of the network connection state.

According to embodiments of the present invention, it is advantageous to provide a method and a system of authentication, which have further enhanced security by using an OTP, and the like.

BRIEF DESCRIPTION OF THE DRAWINGS

Drawings associated with a first embodiment of the present invention are illustrated in FIGS. 1 to 8.

FIG. 1 is a diagram for describing a method and a system of mutual authentication between an online service server and a service user according to an embodiment of the present invention.

FIG. 2 is a block diagram of an embodiment of an OTP authentication server implementing the mutual authentication method according to the embodiment of the present invention.

FIG. 3 is a block diagram of an embodiment of an OTP generator implementing the mutual authentication method according to the embodiment of the present invention.

FIG. 4 illustrates an example of an OTP disclosure screen displayed to an online service site by the online service server.

FIG. 5 illustrates an example of a screen in which a verification OTP generated by the OTP generator and a user OTP are displayed through a screen of a mobile device.

FIG. 6 illustrates an example of a screen in which the user OTP is displayed through the screen of the mobile device by a time OTP generation scheme while the verification OTP is driven by the OTP generator in a challenge and response generation scheme.

FIG. 7 is a diagram for describing a method for mutual authentication using an OTP according to another embodiment of the present invention.

FIG. 8 illustrates an example of a screen display on the mobile device according to FIG. 7.

Drawings associated with a second embodiment of the present invention are illustrated in FIGS. 9 to 17.

FIG. 9 is a diagram for describing a method and a system of mutual authentication between an online service server and a service user according to an embodiment of the present invention.

FIG. 10 is a block diagram of an embodiment of an authentication server implementing the mutual authentication method according to the embodiment of the present invention.

FIG. 11 is a block diagram of an embodiment of a simpler authenticator implementing the mutual authentication method according to the embodiment of the present invention.

FIG. 12 illustrates an example associated with a screen in which a simple authentication number is disclosed in an online service site operated by an online service server.

FIG. 13 is an example associated with a screen in which an inspection authentication number generated by the simpler authenticator is displayed.

FIG. 14 is a diagram for describing a processing method when an access by a hacker is attempted during an authentication process by the mutual authentication method of FIG. 9.

FIG. 15 is a diagram illustrating a processing result disclosed in the online service site operated by the online service server when the access by the hacker is attempted as illustrated in FIG. 14.

FIGS. 16 and 17 illustrate an implementation example of the mutual authentication method according to the embodiment of the present invention at the time of accessing the online service server through a mobile device of a user.

Drawings associated with a third embodiment of the present invention are illustrated in FIGS. 18 to 21.

FIG. 18 is a diagram for describing a method and a system of user authentication according to an embodiment of the present invention.

FIG. 19 is a block diagram of an embodiment of an online service server associated with the user authentication method according to the embodiment of the present invention.

FIG. 20 is a block diagram of an embodiment associated with an OTP authentication server implementing the user authentication method according to the embodiment of the present invention.

FIG. 21 is a block diagram of an embodiment associated with an OTP generator implementing the user authentication method according to the embodiment of the present invention.

Drawings associated with a fourth embodiment of the present invention are illustrated in FIGS. 22 to 24.

FIG. 22 is a diagram for describing a driving environment inspection method of the OTP app according to an embodiment of the present invention and an authentication system using the same.

FIGS. 23 and 24 are block diagrams of an embodiment for an OTP app and an OTP authentication server for implementing the driving environment inspection method of the OTP app according to the embodiment of the present invention.

Drawings associated with a fifth embodiment of the present invention are illustrated in FIGS. 25 to 31.

FIG. 25 is a diagram illustrating a functional block of the transaction related OTP application as an embodiment of the present invention.

FIG. 26 is a schematic flowchart for a method of driving the OTP application according to the embodiment of the present invention.

FIGS. 27 to 31 are diagrams exemplifying execution screens of the transaction related OTP application as the embodiment of the present invention.

DETAILED DESCRIPTION

The present invention may have various modifications and various embodiments and specific embodiments will be illustrated in the drawings and described in detail in the detailed description. However, this does not limit the present invention within specific exemplary embodiments, and it should be understood that the present invention covers all the modifications, equivalents and replacements within the idea and technical scope of the present invention.

Further, in the following description, a detailed explanation of known related technologies may be omitted to avoid unnecessarily obscuring the subject matter of the present disclosure. In addition, numeral figures (for example, 1, 2, and the like) used during describing the specification just are identification symbols for distinguishing one element from another element.

Further, throughout the specification, If it is described that one component is "connected" or "accesses" the other component, it is understood that the one component may be directly connected to or may directly access the other component but unless explicitly described to the contrary, another component may be "connected" or "access" between the components.

Moreover, throughout the specification, unless explicitly described to the contrary, the word "comprise" and variations such as "comprises" or "comprising", will be understood to imply the inclusion of stated elements but not the exclusion of any other elements. Further, terms including "unit", "module", and the like disclosed in the specification mean a unit that processes at least one function or operation and this may be implemented by one or more hardware or software or a combination of hardware and software.

[First Embodiment—Mutual Authentication Method and System #1] (Dual OTP)

The embodiment relates to a method and a system of mutual authentication using an OTP. In more detail, the embodiment relates to a method and a system of mutual authentication using an OTP, which mutual inspection between a service provider and a service user is enabled by a scheme that provides user authentication information after inspecting whether a server providing an online service is a server by an authentic service providing subject.

In recent years, in an electronic financial service or Internet of Things (IoT) facility control service, the one time password (OTP) has been introduced in order to enhance user authentication. However, a current OTP technology is just used to inspect whether the service user is a proper user and not used to inspect that the online service accessed by the user is counterfeited or not a pharming server operated by a hacker.

A pharming attack is an attack which allows the user to cognize a website operated by the hacker to extort account information (e.g., an ID and a password) of the user, an OTP value which the user inputs in an OTP input window, and the like and for the hacker to snatch money or information of the user by using the extorted account information and OTP value.

Accordingly, it is necessary to inspect that the server accessed by the user is a server which is not counterfeited in order to prevent the farming attack. For inspecting the service server, in the related art, a scheme is used, which allows the user to personally upload a personal image to the service server to display whether the service server is a normal site or change a color of an address window by using a secure socket layer (SSL) to display that the service server is the normal site.

However, in a method for registering a personalized image, there are many cases in which the user does not spontaneously register the personal image, usability significantly deteriorates and an address window color change service is displayed differently for each browser and not also easily cognized, and as a result, there are many cases in which the user confuses the address window color change services. Accordingly, a method and a technology enhanced are required, which allow the user to naturally inspect and perform the user authentication.

In the embodiment, in order to provide a safe online service, provided are a method and a system which displays a server inspection OTP on a user authentication OTP disclosure screen together to first verify that the corresponding service a service provided by an authentic service subject before the user inputs a user authentication OTP value and thereafter, inputs the user authentication.

In the following description, as an OTP generator, a software OTP generator installed in a mobile device owned by the user in the form of an application program is primarily described, but the present invention is not particularly limited thereto, of course. For example, the OTP generator may be a hardware OTP generating device having a communication function. However, hereinafter, the embodiment of the present invention will be described by assuming a former case for convenience and concentration of the description.

Further, hereinafter, a case is assumed and described, in which a client terminal as an access terminal which accesses the online service server and the OTP generator are physically separately configured based on FIG. 1, but the OTP generator may be implemented integrally with the client terminal. In the latter case, the mobile device illustrated in FIG. 1 will be omitted. Further, it is apparent that the client terminal itself may be the mobile device.

FIG. 1 is a diagram for describing a method and a system of mutual authentication between an online service server and a service user according to an embodiment of the present invention. Herein, FIG. 2 is a block diagram of an embodiment of an OTP authentication server implementing the mutual authentication method according to the embodiment of the present invention and FIG. 3 is a block diagram of an embodiment of an OTP generator implementing the mutual authentication method according to the embodiment of the present invention. Further, herein, FIG. 4 illustrates an example of an OTP disclosure screen displayed to an online service site by the online service server and FIG. 5 illustrates an example of a screen in which a verification OTP generated by the OTP generator and a user OTP are displayed through a screen of a mobile device. Further, FIG. 6 illustrates an example of a screen in which the user OTP is displayed through the screen of the mobile device by a time OTP generation scheme while the verification OTP is driven by the OTP generator in a challenge and response generation scheme. Hereinafter, the method and the system of mutual authentication according to the embodiment of the present invention will be described in detail with reference to FIGS. 2 to 6.

Referring to step S1 of FIG. 1, when the service user intends to use the online service by the online service site provided by an online service server 130, the service user requests accessing the online service server 130.

For example, when the online service which the service user intends to is an online banking service, the user may access a specific online service server (that is, a specific bank server providing the online banking service) that provides the corresponding online banking service. The access to the online service server 130 may be achieved by a mobile access through a mobile device 110 (e.g., a smart phone, and the like) owned by the user, of course, but in FIG. 1, it is illustrated that the user accesses the online service server 130 through a client terminal 100 (e.g., a company PC, and the like) apart from the user's own mobile device 110.

Referring to step S2 of FIG. 1, according to the access request to the online service server 130, the online service server 130 may request input of user account information to the service user which intends to use the online service. Herein, the user account information means identification information of the corresponding user which the corresponding online service server 130 previously stores (registers) through a user registration procedure (alternatively, a service joining procedure). In genera, as the user account information, a user identifier (ID) and a password may be used. However, in the case of information to identify the user who uses the corresponding online service, various information (e.g., an e-mail address, a phone number, a written authentication password on a written authentication based on a public key infrastructure (PKI), and the like) may be substituted and used as the user account information in addition to the corresponding information.

Referring to step S3 of FIG. 1, according to the input request of the user account information, the service user inputs the user account information in the corresponding online service site. Referring to step S4 of FIG. 1, when the user account information is input from the service user, the online service server 130 verifies whether an account matching the user account information input by the user is present. An account DB 140 illustrated in FIG. 1 may be used for verifying the account information. Account information on users (that is, members) who may receive the online service through the corresponding online service server 130 is kept in the account DB 140. In FIG. 1, a case is illustrated, in which the account DB 140 is provided apart from the online service server 130, but the account DB 140 may be implemented while being integrated with the online service server 130, of course. Further, according to a system implementation scheme, the account DB 140 may be implemented to be integrated with an OTP authentication server 150.

Referring to step S5 of FIG. 1, when the input user account information matches the user account kept in the account information DB 140, the online service server 130 requests generation of a server inspection OTP to the OTP authentication server 150. Herein, the server inspection OTP may be used for the user to determine whether the online service site currently accessed by the user is provided by an authentic online service provider.

In FIG. 1, it is illustrated that this step (that is, step S5) is executed immediately after the previous user account verifying procedure (that is, step S4), but the execution order may different therefrom, of course. For example, the generation request of the server inspection OTP by this step may be executed only when the user selects an OTP authentication scheme as an authentication means after the user account verifying procedure is completed.

Further, in FIG. 1, it is illustrated that the online service server 130 requests generation of the server inspection OTP to the OTP authentication server 150, but the present invention may be different therefrom. For example, when verifying the user account is completed, the service user may request generation of the server inspection OTP to the OTP authentication server 150. A detailed implementation scheme thereof may be described below. When verifying the user account is completed, and as a result, the service access to the online service site is achieved, a scheme may be used, in which the user transmits the generation request of the server inspection OTP to the OTP authentication server through the OTP generator 120 installed in the mobile device 110 thereof. However, hereinafter, the generation request of the server inspection OTP will be described based on FIG. 1 in which the server inspection OTP generation request is transmitted from the online service server 130 to the OTP authentication server 150, for convenience and concentration of the description.

The server inspection OTP generation request is accepted (received) through a communication interface unit 151 of the OTP authentication server 150.

Referring to step S6 of FIG. 1, according to the server inspection OTP generation request from the online service server 130, the OTP authentication server 150 generates the server inspection OTP. In this case, the server inspection OTP may be generated by a server inspection OTP generating unit 153 of the OTP authentication server 150. Hereinafter, various embodiments of a generation method of the server inspection OTP will be described in detail.

In the embodiment of the present invention, as an OTP generation key to be used as a seed value for generating the OTP, a fixation key previously registered to correspond to the user account information of the service user may be used.

As an example, the fixation key corresponding to the user account information may be used by previously registering any one of various user identification information including the user ID, the password, the e-mail address of the user, the phone number, the written authentication password, and the like or a combination of at least two. As another example, the fixation key corresponding to the user account information may be used by previously registering any one of identifies including a phone number, a product serial number, a USIM card number, a MAC address, and the like of the user's own mobile device (e.g., the smart phone, and the like) or a combination of at least two. As yet another example, as the fixation key corresponding to the user account information, a personal key personally selected and registered by the user when the user registers an OTP authentication service or granted at the time of registering the OTP authentication service may be used.

In another embodiment of the present invention, as the OTP generation key to be used as the seed value for generating the OTP, a fixation key previously registered to correspond to identification information of the authentic online service server which the user intends to access may be used. As an example, a server IP address (may be the entirety or a part of the corresponding IP address) of the corresponding online service server may be used as the OTP generation key.

In yet another embodiment of the present invention, as the OTP generation key to be used as the seed value for generating the OTP, a dynamic allocation key dynamically allocated at the time when the user accesses the corresponding online service server may be used.

As an example, as the dynamic allocation key to be used as the OTP generation key, access terminal connection information of the service user who accesses the corresponding online service server may be used. In this case, as the access terminal connection information, session information (e.g., a session ID, and the like) or socket information (e.g., a socket handle, and the like) allocated to the access terminal of the service user in the corresponding online service server may be used when the service user accesses the online service server.

Herein, the session ID is value granted by the corresponding server in order to manage consecutive data transmission/ reception between the server and the access terminal and the socket handle information is a predetermined connection characteristic value which the corresponding server spontaneously allocates in order to manage a socket as a unit to transmit/receive data between the server and the access terminal through a network. Since it is difficult for a hacker to extort the session ID or socket handle information as a value dynamically allocated and spontaneously granted by the corresponding server outside the server, when the session ID or socket handle information is used as the OTP generation key, it is advantageous in terms of security.

As another example, as the dynamic allocation key to be used as the OTP generation key, a mobile IP address (may be the entirety or a part of the IP address) which a mobile communication company dynamically allocates to the mobile device owned by the service user may be used. For example, when it is assumed that the service user accesses the corresponding online service server through the mobile device thereof, the mobile IP address dynamically allocated by the mobile communication company may be used as the OTP generation key.

Further, in addition to the embodiments associated with the OTP generation key described above, more various values may be used as the seed value for generating the OTP. As described below, in the mutual authentication method between the online service server and the service user according to the embodiment of the present invention, the server inspection OTP and the user OTP are generated as values paired with each other. Accordingly, the OTP generation key may be variously substituted and used within the limit in which two OTP values may be paired with each other.

In the embodiment of the present invention, as the server inspection OTP, the OTP generation key is used and a specific calculation condition is applied to the server inspection OTP to be generated. In this case, the applied calculation condition will be described below in step S10 to be described below. Therefore, it may be more clearly appreciated that the server inspection OTP and the user OTP are generated as the values paired with each other.

Referring to step S7 of FIG. 1, when the server inspection OTP is generated through the above step, the OTP authentication server 150 transmits the corresponding OTP generation condition to the OTP generator 120 installed in the mobile device 110 owned by the service user through the communication interface unit 151.

In FIG. 1, it is illustrated that the OTP generation condition of step S7 is transmitted through a push server 160, but the present invention is not particularly limited and the OTP authentication server 150 may directly transmit the OTP generation condition to the OTP generator 120, of course. Further, in FIG. 1, a case in which the OTP generation condition is transmitted through a push message primarily illustrated, but the OTP generation condition may be transmitted by the socket transmission scheme.

When the OTP authentication server 150 transmits the OTP generation condition through the push server 160, the OTP authentication server 150 transfers the OTP generation condition to the push server 160 and in this case, the push server 160 may transmit the OTP generation condition to the OTP generator 120 through the push message. Herein, the push message may be a message service provided for each application in a specific mobile operating system. However, it is apparent that the OTP generation condition need not particularly be transmitted by the push message and the OTP generation condition may be transmitted by various commercial messaging services including SMS, MMS, and the like or a specific communication protocol. In other exemplary cases in which the OTP generation condition is not transmitted by the push message, a function of the push server 160 may be substituted with a function of a general communication server.

Further, in FIG. 1, a case in which the OTP generation condition is directly transmitted to the OTP generator 120 is primarily described, but the present invention is not particularly limited thereto. For example, it is apparent that the OTP generation condition is transmitted to the mobile device 110 through the push message, and the like and the OTP generator 120 reads the OTP generation condition to receive (acquire) the OTP generation condition. The OTP generation condition may be received by an OTP generation receiving unit 121 of the OTP generator 120.

Herein, the OTP generation condition transmitted to the OTP generator 120 may be an OTP calculation condition or/and OTP generation key information. However, which information the OTP generation condition transmitted through step S7 is particularly associated with will be described in detail in step S10 to be described below.

Further, referring to step S8 of FIG. 1, the OTP authentication server 150 transfers the server inspection OTP generated through step S6 given above to the online service server 130 through the communication interface unit 151.

Steps S7 and S8 described above may be simultaneously performed or performed in different sequences unlike the example illustrated in FIG. 1. This is similar even in cases of steps S9 and S10 to be described below.

Referring to step S9 of FIG. 1, with the transfer of the server inspection OTP, the online service server 130 discloses the transferred server inspection OTP on an on OTP disclosure screen of the online service site and requests input of the user OTP through the same screen. An example thereof is illustrated in FIG. 4.

Referring to FIG. 4, the OPP disclosure screen 10 includes an OTP display window 10A disclosing (displaying) the server inspection OTP on the top thereof and an OTP input window 10B requesting input of the user OTP on the bottom thereof, which is adjacent to the OTP display window 10A, and an OK button 10C. In this case, the OTP display window 10A disclosing the server inspection OTP and the OTP input window 10B in which the user OTP is to be input may be displayed in the OPT disclosure screen 10 with different colors and shapes so as to be immediately cognitively distinguished by the service user. As an example, the OTP display window 10A givens an orange shadow effect in a display window and the OTP input window 10B gives a yellow shadow effect in the display window to visually distinguish and the OTP display window 10A and the OTP input window 10B from each other.

In this regard, although described below even through step S10, the same effect as the cognitive distinguishing effect applied to the OTP display window 10A and the OTP input window 10B displayed in the OTP disclosure screen 10 is applied to a display window (see 20A of FIG. 5) of a verification OTP (an OTP corresponding to the server inspection OTP) and a display window (see 20B of FIG. 5) of the user OTP to be displayed through a screen of the user mobile device to be displayed.

Therefore, the service user may intuitively appreciate purpose distinguishment of the server inspection OTP and the user OTP without a particular difficulty. That is, the service user may intuitively find the display window (see 20A in the case of FIG. 5) on the mobile device screen to which the same cognitive distinguishing effect as the OTP display window 10A in the OTP disclosure screen 10 is applied and verifies whether numbers (that is, the server inspection OTP and verification OTP values) disclosed in respective display windows match each other to immediately determine whether the corresponding online service server is true. Further, the service user may intuitively find the display window (see 20B in the case of FIG. 5) on the mobile device screen to which the same cognitive distinguishing effect as the OTP input window 10B in the OTP disclosure screen 10 is applied and intuitively input numbers (that is, the user OTP values) disclosed in the corresponding display window (see 20B in the case of FIG. 5) in the OTP input window 10B of the OTP disclosure screen 10.

Referring to step S10 of FIG. 1, with the transmission of the OTP generation condition of step S7 given above, the OTP generator 120 generates the verification OTP through a verification OTP generating unit 123 and generates the OTP through a user OTP generating unit 125.

Herein, the verification OTP is an OTP value which is generated by the OTP authentication server 150 to be generated by the OTP generator 120 to correspond to the server inspection OTP disclosed in the OTP disclosure screen (see reference numeral 10 of FIG. 3) on the online service site of the online service server 130. Therefore, when the verification OTP and the server inspection OTP disclosed in the OTP disclosure screen 10 match each other, the service user may determine that the corresponding online service server is an authentic service server (that is, whether the service server is true).

In the embodiment of the present invention, the OTP generator 120 may generate the verification OTP and the user OTP by the following scheme. Fundamentally, the verification OTP and the user OTP generated by the OTP generator 120 have values paired with each other. This may be implemented by using the same OTP generation key value as each other during the OTP generation process and applying different calculation conditions to generate the OTP. This is similarly applied even to generation of the server inspection OTP and an OTP (this is an OTP value having a concept, which corresponds to the user OTP) corresponding thereto in the OTP authentication server 150. Hereinafter, this will be described below in detail.

In an embodiment, the verification OTP (alternatively, the server inspection OTP) which uses the various OTP generation keys as the seed value is generated by the challenge and response generation scheme and the user OTP (alternatively, the corresponding OTP) which uses the same OTP generation keys as the seed value is generated by the time OTP generation scheme to adopt different calculation operations from each other. An example thereof is illustrated in FIG. 6. Referring to FIGS. 6(*a*) and 6(*b*), since the verification OTP (see a service OTP of FIG. 6) displayed on the mobile device screen of the user is generated by the challenge and response scheme, the verification OTP has the same value regardless of a time, but since the user OTP is generated by the time OTP scheme, it may be verified that the value is changed after a valid time elapsed.

Herein, the challenge and response scheme is a scheme that generates the OTP by using the number of attempt times as the calculation condition. Therefore, the OTP may be generated with a value acquired by encrypting a value acquired by multiplying a determined specific OTP generation key by the number of attempt times as the calculation condition according to a specific hash function. Further, herein, the time OTP scheme is a scheme that generates the OTP by using a generation time as the calculation condition. Therefore, the OTP may be generated with a value acquired by encrypting a value acquired by multiplying the determined specific OTP generation key by the generation time as the calculation condition according to the specific hash function.

According to the aforementioned example, the OTP authentication server 150 may transmit information on the number of attempt times as the calculation condition according to the challenge and response scheme to the OTP generator 120 as an OTP generation condition used at the time of generating the server inspection OTP through step S7 given above. However, in this case, the OTP generation key used to generate the server inspection OTP need not particularly be transmitted to the OTP generator 120. When the fixation key described through step S6 given above is used as the OTP generation key, the corresponding fixation key is configured to be previously kept in a key keeping unit (not illustrated) of the OTP generator 120 and may be directly used, and as a result, in this case, only the calculation condition may be transmitted through step S7. On the contrary, when the dynamic allocation key (e.g., the session ID, and the like) is used as the OTP generation key, the OTP generation key may also be transmitted to the OTP generator 120 through step S7 together with the calculation condition.

As a result, the verification OTP generating unit 123 of the OTP generator 120 may generate the verification OTP having the same value as the server inspection OTP generated by the OTP authentication server 150 based on the received OTP generation condition.

Further, the user OTP generating unit 125 of the OTP generator 120 may uses the same generation key as the OTP generation key used to generate the verification OTP and generate the user OTP by using the generation time as the calculation condition. In this case, the generation time to be used as the calculation condition of the generation of the user OTP may be transmitted from the OTP authentication server 150 to the OTP generator 120 through step S7 given above. As a result, the verification OTP and the user OTP generated by the OTP generator 120 which are based on the same OTP generation key may be generated as values paired with each other according to different calculation conditions.

Hereinabove, a case has been primarily described, in which the verification OTP and the user OTP which are based on the same OTP generation key are generated according to different calculation conditions, respectively to have the values paired with each other. However, according to another embodiment of the present invention, the same calculation condition is applied to the verification OTP and the user OTP which are based on different OTP generation keys to be generated as the values paired with each other, of course. However, hereinafter, the former case will be primarily described for convenience and concentration of the description.

The verification OTP and the user OTP generated according to the aforementioned scheme may be displayed through the screen of the mobile device 110 by an OTP displaying unit 127 of the OTP generator 120. A screen display example thereof is illustrated through FIG. 5. In FIG. 5, the verification OTP is displayed on the screen of the mobile device through the display window of reference numeral 20A and the user OTP is displayed (that is, displayed to be visually paired with each other) in line on the same screen through the display window of reference numeral 20B.

As a result, the server user compares the server inspection OTP disclosed in the OTP display window 10A of the OTP disclosure screen illustrated in FIG. 4 and the verification OTP disclosed in the left display window 20A of FIG. 5, which are displayed through the online service site to determine whether the corresponding site is true. Further, the service user may input the user OTP value disclosed in the right display window 20B of FIG. 5 in the OTP input window 10B of the OTP disclosure screen of FIG. 4 [see step S11 of FIG. 1].

In this case, in the OTP authentication server 150, for a user OTP input valid time (e.g., 60 seconds) depending on the access attempt to the online service server 130 by the service user or before the user OTP is input, the server inspection OTP value disclosed in the OTP display window 10A of the OTP disclosure screen may be maintained as it is. That is, before the user OTP input valid time elapsed or before the user OTP is input, even when the posterior access using the same account information as the user account information of the corresponding service user is reattempted (for example, when an additional access by the hacker is attempted after an access by an authentic user), the OTP authentication server 150 may maintain the existing OTP value as it is without generating a new server inspection OTP. Therefore, illegal user authentication depending on the posterior access by the hacker and information extortion thereby may be prevented.

Hereinabove, a case has been primarily described, in which the verification OTP (alternatively, the server inspection OTP) and the user OTP (alternatively, the corresponding OTP) are generated according to different calculation conditions by the challenge and response scheme and the time OTP scheme, respectively to have the values paired with each other. However, the above description is just one example and the verification OTP and the user OTP may be generated as the values paired with each other.

For example, both the OTP generation key and the OTP generation scheme are made to be the same as each other and different mode distinguishers are applied as the calculation condition to have the values paired with each other. When this is described by using a more detailed example, the session IDs of both sides (that is, the verification OTP and the user OTP or the server inspection OTP and the corresponding OTP) are used as the OTP generation key and both sides are generated by the time OTP scheme and 1 as a mode distinguisher is further added to any one and 2 as the mode distinguisher is further added to the other one to generate the OTP, and as a result, the verification OTP and the user OTP to have the values paired with each other.

That is, within the limit in which the OTP generation as the seed value of the generation of the OTP is the same and one or more calculation conditions are differently applied, and as a result, the verification OTP and the user OTP are generated as the values paired with each other, besides, more various modified examples may be present and all of the modified examples will be included in the embodiment of the present invention.

Hereinabove, the scheme has been primarily described, in which the OTP input window is displayed on the OTP disclosure screen and further, the service user personally inputs the user OTP, but the present invention need not particularly be limited thereto and the scheme may be modified to various schemes to achieve the same effect, of course. For example, only the server inspection OTP may be disclosed on the OTP disclosure screen and the OTP input window for inputting the user OTP may not be separately disclosed. Further, the user OTP is not personally input by the service user and may be input through a specific gesture. For example, when it is verified that the server inspection OTP is true through the verification OTP, various gestures including an action in which the user just touches and selects the user OTP displayed through a touch screen of the mobile device, a touch gesture to push up the corresponding screen upward, and the like are taken, and as a result, the user OTP may be implemented to be automatically input.

When the user OTP value is input through step S11, the online service server 130 may request (that is, request the user authentication) verifying the user OTP value input in the OTP authentication server 150 [see step S12 of FIG. 1].

As a result, referring to step S13 of FIG. 1, a corresponding OTP generating unit 155 of the OTP authentication server 150 applies the same condition as the user OTP generated by the OTP generator 120 in step S10 given above to generate the corresponding OTP. In addition, an authentication processing unit 157 of the OTP authentication server 150 compares whether the generated corresponding OTP and the input user OTP match each other to perform user authentication of the corresponding service user. In this case, an authentication result may be notified to the online service server 130 [see step S14 of FIG. 1] and when the authentication is normally achieved, the online service server 130 may start the corresponding service to the corresponding service user [see step S15 of FIG. 1].

Hereinabove, the mutual authentication method between the online service server and the service user according to the embodiment has been described. Hereinafter, a mutual authentication method according to another embodiment of the present invention will be described with reference to FIGS. 7 and 8. Herein, FIG. 7 is a diagram for describing a method for mutual authentication using an OTP according to another embodiment of the present invention and FIG. 8 illustrates an example of a screen display on the mobile device according to FIG. 7. A detailed description of contents which may be duplicated with the mutual authentication method described with reference to FIGS. 1 to 6 given above during describing the mutual authentication method according to another embodiment of the present invention by referring to FIGS. 7 and 8 will be omitted.

FIG. 7 illustrates a case to which the mutual authentication method according to the embodiment of the present invention is applied in performing a settlement service by using a settlement application 120A installed in the use's own mobile device when an online service server as a service inspection target is specialized as a settlement server 130A. Herein, an inspection module 120B performs the fundamentally same or similar function as or to the OTP generator 120 of FIG. 1 described above. The inspection module 120B may be implemented by a separate application, but implemented together in the settlement application 120A as a partial function of the settlement application 120A. As a result, in the example, it is assumed that the settlement application 120A and the inspection module 120B are implemented as one application program (see reference numeral A of FIG. 7) to be installed in the user's own mobile device (see reference numeral 110 of FIG. 1).

When input of a personal identification number (PIN) by the user and inspection (that is, inspection of the input PIN) thereof are completed as the settlement application 120A is driven as described in step S1 of FIG. 7 (see FIG. 8(*a*)), the settlement application 120A may extract the user serial number from the inspection module 120B according to step S2 of FIG. 7 and request the server inspection OTP to the settlement server 130A according to step S3 of FIG. 7.

In this case, the user serial number may be a user's characteristic value used when the settlement application 120A and the inspection module 120B are registered in an OTP authentication server 150A as one application. The user serial number may be transmitted to the settlement server 130A together at the time of requesting the server inspection OTP. Hereinafter, the method will be described based thereon.

When the server inspection OTP request is received together with the user serial number, the settlement server 130A transfers the server inspection OTP request to the OTP authentication server [see step S4 of FIG. 7], and as a result, the OTP authentication server 150A generates the server inspection OTP [see step S5 of FIG. 7].

As the generation method of the server inspection OTP through the OTP authentication server 150A, various methods may be used as described through FIGS. 1 to 6 given above. However, in the example, it is assumed that as the seed value of the generation of the server inspection OTP, a personal key, an IP address of a settlement server, and a session ID spontaneously generated by the settlement server are used and the server inspection OTP is generated by the challenge and response scheme. In this case, as the personal key, a predetermined key value kept to correspond to the corresponding user, which is verified by the user serial number may be used and in some cases, the user serial number value may be used as it is. In this case, the OTP authentication server 150A needs to receive an IP address of the settlement server 130A and a session ID allocated for communication access with the settlement application 130a from the settlement server 130A in order to generate the server inspection OTP. In an embodiment, the IP address of the settlement server 130A and the session ID may be transferred from the settlement server 130A to the OTP authentication server 150A through step S4 of FIG. 7.

The OTP authentication server 150A may transmit the OTP generation condition used for generating the server inspection OTP to the inspection module 120B [see step S6 of FIG. 7]. In this case, since the transmission method of the OTP generation condition from the OTP authentication server 150A to the inspection module 130B is fundamentally the same as the method in step S7 of FIG. 1 described above, a duplicated description thereof will be omitted. That is, the push server 160 of FIG. 1, and the like are not directly illustrated in FIG. 7, but this step may be performed by the same scheme as step S7 of FIG. 1 given above.

Further, the OTP authentication server 150A may transfer the server inspection OTP generated according step S5 of FIG. 7 [see step S7 of FIG. 7] and the settlement server 130A may transmit the received server inspection OTP to the settlement application 120A [see step S8 of FIG. 7]. In this case, the settlement application 120A may transfer the received server inspection OTP to the inspection module 120B [see step S9 of FIG. 7]. However, the server inspection OTP generated by the OTP authentication server 150A need not particularly be transferred to the inspection module 120B through steps S7, S8, and S9. For example, during the transmission process of the OTP generation condition depending on step S6, the server inspection OTP may be together transmitted. However, in the present specification, the former case will be primarily described for convenience and concentration of the description.

As a result, the inspection module 120B generates the verification OTP corresponding to the server inspection OTP by referring to the OTP generation condition received through step S6 given above and compares whether the server inspection OTP received through step S9 and the spontaneously generated verification OTP to perform server inspection [see step S10 of FIG. 7].

Through the aforementioned step, when the server inspection is completed, the inspection module 120B may generate the user OTP according to a predetermined scheme [see step S11 of FIG. 7] and transfer the generated user OTP to the settlement application 120A [see step S12 of FIG. 7]. In this case, the transferred user OTP may be transmitted from the settlement application 120A to the settlement server 130A [see step S13 of FIG. 7] and transmitted to the OTP authentication server 150A again [see step S14 of FIG. 7].

Herein, various schemes described through FIGS. 1 to 6 given above may also be applied to the generation method of the user OTP in the inspection module 120B. However, in this example, it is assumed that the personal key and the session ID which are used as the seed value for the server inspection OTP are used as they are as the seed value of the generation of the user OTP and the time OTP scheme is applied to a private IP address of the mobile device in which the inspection module 120B is installed as an additional seed value to generate the user OTP. That is, in this example, the user OTP and the server inspection OTP use the personal key and the session ID as the same generation key and the OTP is generated by the challenge and response scheme by using the server IP address as the additional seed value during the generation process of the server inspection OTP and the OTP is generated by the time OTP scheme by using a mobile IP address as the additional seed value during the generation process of the user OTP, and as a result, the OTPs may be generated as the values paired with each other. However, in the mutual authentication method according to another embodiment of the present invention, there is a limit that the user OTP and the server inspection OTP will be particularly implemented as the values paired with each other according to a system implementation scheme.

When a user OTP inspection request is received according to step S14 of FIG. 7, the OTP authentication server 150A generates the corresponding OTP corresponding to the received user OTP under the same generation condition as step S11 of FIG. 7 and compares whether the received user OTP and the spontaneously generated corresponding OTP match each other to perform the user authentication [see step S15 of FIG. 7]. A user authentication result in this case is transmitted to the settlement server 130A [see step S16 of FIG. 7] and when it is determined that a user accessing the service is a proper user according to the authentication result, the settlement server 130A performs the corresponding service [see step S17 of FIG. 7]. While the user authentication is completed, a settlement application screen displayed through the screen of the user's own mobile device is illustrated in FIG. 8(b).

Referring to FIGS. 8(a) and 8(b), it may be verified that the screen display scheme is different from the screen display scheme in FIGS. 5 and 6, which is described above. Referring to FIG. 8, in the mutual authentication method according to another embodiment of the present invention, which is illustrated in FIG. 7, the server inspection OTP and the user OTP are not displayed through a service site screen and an application screen unlike the mutual authentication method illustrated in FIGS. 5 and 6. That is, according to the embodiment of FIG. 7, the server inspection OTP and the user OTP are not exposed to the user and used only in mutual authentication internally performed in a system. Accordingly, after the user inputs the PIN according to step S1 of FIG. 7 (see FIG. 8(a), a series of processes of steps S2 to S16 of FIG. 7 are internally processed in the system and when the mutual authentication is completed according to the series of process, the service start screen of FIG. 8(b) is immediately displayed on the application screen.

According to the embodiment, after the server inspection OTP which the server presents through a screen to input the OTP value is inspected for the user authentication, the user inputs the user authentication OTP value to simultaneously inspect a service providing server and perform the user authentication.

[Second Embodiment—Mutual Authentication Method and System #2] (Dual Check)

The embodiment relates to a method and a system of authentication, and more particularly, a method and a system of mutual authentication between an online service server and a client.

When a convenient electronic financial service or an important online service are intended to be safely used, a separate authentication method is configured in addition to an ID and a password used on the online service to increase safety for user authentication. Representatively, the user authentication depending on pirating of the password is enhanced by using an OTP dongle, a disposable password through SMS, a disposable password through ARS, mobile application based user biometric authentication, and the like.

However, conventional additional authentication means requires a user's complicated input such as user's directly input the disposable password generated between the online service and an authentication medium or input of separate biometric information. In particular, when a temporary password of 4 to 6 digits needs to be reinput in a mobile phone, it is difficult even to be aware of a number verified through a mobile phone screen and it is complicated to input the verified number.

In order to remove the input of the temporary password, there is a service in which when the user logs on the service with the ID and the password, the user sends push information to the mobile phone and when the user drives a user verification authentication application, the user inputs biometric information (fingerprints, a face, iris, and the like) thereof in the mobile application to automatically log on the online service when the user is proper and even in this service, complication for inputting the biometric information occurs.

As another simple authentication scheme, provided also is an access verification scheme that announces the user access through a mobile push message and when the user inputs the ID ad the password in the online service and approves or rejects whether to access the online service when the user drives an access approval application while an access control application to determine whether to approve the access is previously installed in a designated mobile phone of the user in order to minimize the input of the user. However, in such a scheme, in the case where the service accessed by the user is a pharmed site of the hacker, when the hacker countermines the ID and the password input by the user and transmits the ID and the password to an actual online service, a problem occurs, in which when an access verification request is received by the mobile phone of the user, the user mistakes the access verification request as the access of the user and approves the corresponding access. Moreover, when the hacker who knows the ID and the password of the user accesses the mobile phone with the ID and the password of the corresponding user as soon as an actual user accesses the mobile phone, the user may mistake a final access content which reaches a smart phone thereof as the final access content thereof and approve the corresponding access.

Accordingly, required are an enhanced method and an enhanced technology in which the user may determine whether the corresponding site is normal and verify even the access thereof or not without complication to reinput the temporary password.

The embodiment provides a method and a system for simple authentication, which allow the user to verify whether the online service is a proper service and thereafter, conveniently perform the access without inputting a separate disposal password or biometric information at the time of performing 2-fact authentication (that is, service authentication and mutual authentication depending on the user authentication) for safe use of the online service.

In the following description, as a simpler authenticator, a software type authentication device installed in a mobile device owned by the user in the form of an application program is primarily described, but the present invention is not particularly limited thereto, of course. For example, the simpler authenticator may be a hardware authentication device having a communication function. However, hereinafter, the embodiment of the present invention will be described by assuming the former case for convenience and concentration of the description.

Further, hereinafter, a case is assumed and described, in which a client terminal as an access terminal which accesses the online service server and the simple authenticator are physically separately configured based on FIG. 9, but the simple authenticator may be implemented integrally with the client terminal. In the latter case, the mobile device illustrated in FIG. 9 will be omitted. Further, it is apparent that the client terminal itself may be the mobile device.

FIG. 9 is a diagram for describing a method and a system of mutual authentication between an online service server and a service user according to an embodiment of the present invention. Further, FIG. 10 is a block diagram of an embodiment of an authentication server implementing the mutual authentication method according to the embodiment of the present invention and FIG. 11 is a block diagram of an embodiment of a simpler authenticator implementing the mutual authentication method according to the embodiment of the present invention. Hereinafter, the method and the system of mutual authentication according to the embodiment of the present invention will be described with reference to FIGS. 10 to 11 based on FIG. 9.

Further, the embodiment of the present invention is described by referring to FIGS. 12 to 17 together. Herein, FIG. 12 illustrates an example associated with a screen in which a simple authentication number is disclosed in an online service site operated by an online service server, FIG. 13 is an example associated with a screen in which an inspection authentication number generated by the simpler authenticator is displayed, FIG. 14 is a diagram for describing a processing method when an access by a hacker is attempted during an authentication process by the mutual authentication method of FIG. 9, and FIG. 15 is a diagram illustrating a processing result disclosed in the online service site operated by the online service server when the access by the hacker is attempted as illustrated in FIG. 14. Further, FIGS. 16 and 17 illustrate an implementation example of the mutual authentication method according to the embodiment of the present invention at the time of accessing the online service server through a mobile device of a user.

Referring to step S1 of FIG. 9, when the service user intends to use the online service by the online service site provided by the online service server 230, the service user requests accessing the online service server 230.

For example, when the online service which the service user intends to is an online banking service, the user may access a specific online service server (that is, a specific bank server providing the online banking service) that provides the corresponding online banking service. The access to the online service server 230 may be achieved by a mobile access through a mobile device 210 (e.g., a smart phone, and the like) owned by the user, of course, but in FIG. 9, it is illustrated that the user accesses the online service server 230 through a client terminal 200 (e.g., a company PC, and the like) apart from the user's own mobile device 210.

Referring to step S2 of FIG. 9, according to the access request to the online service server 230, the online service server 230 may request input of user account information to the service user which intends to use the online service. Herein, the user account information means identification information of the corresponding user which the corresponding online service server 230 previously stores (registers) through a user registration procedure (alternatively, a service joining procedure). In genera, as the user account information, a user identifier (ID) and a password may be used. However, in the case of information to identify the user who uses the corresponding online service, various information (e.g., an e-mail address, a phone number, a written authentication password on a written authentication based on a public key infrastructure (PKI), and the like) may be substituted and used as the user account information in addition to the corresponding information.

Referring to step S3 of FIG. 9, according to the input request of the user account information, the service user inputs the user account information in the corresponding online service site. Referring to step S4 of FIG. 9, when the user account information is input from the service user, the online service server 230 verifies whether an account matching the user account information input by the user is present. An account DB 240 illustrated in FIG. 9 may be used for verifying the account information. Account information on users (that is, members) who may receive the online service through the corresponding online service server 230 is kept in the account DB 240. In FIG. 9, a case is illustrated, in which the account DB 240 is provided apart from the online service server 230, but the account DB 240 may be implemented while being integrated with the online service server 230. Further, according to a system implementation scheme, the account DB 240 may be implemented to be integrated with the authentication server 250.

Referring to step S5 of FIG. 9, when the input user account information matches the user account kept in the account information DB 240, the online service server 230 requests generation of a simple authentication number to the authentication server 250. Herein, the simple authentication number may be used for the user to determine whether the online service site currently accessed by the user is provided by an authentic online service provider.

In step S5 of FIG. 9, when the online service server 230 requests the generation of the simple authentication number to the authentication server 250, the online service server 230 may transmit the user account information of the corresponding service user to the authentication server 250 together. For example, the online service server 230 may transmit to the authentication server 250 a generation request of the simple authentication number including a user ID of the corresponding user as the user account information.

Further, according to an embodiment, the online service server 230 may additionally transmit client access environment information to the authentication server 250 through step S5 of FIG. 9. Herein, information which may directly or indirectly represent an access environment associated with an access terminal of the corresponding service user accessing the online service server 230 is collectively called the client access environment information. The client access environment information may vary depending on the service server.

For example, in the case of a standard web server as an example, the client access environment information may be constituted by various server variables (host name, REMOTE_HOST) to extract a value of the accessed client terminal, cookie information (HTTP_COOKIE), previous URL (HTTP_PEFERER), a one-step-forwarded IP address (HTTP_X_FORWARDED_FOR), a current IP address (REMOTE_ADDR), a client browser (HTTP_USER_AGENT), a client language (HTTP_ACCEPT_LANGUAGE) or variables (a server host name, a server IP, a session ID value, a maximum session valid time, and the like) of the service server providing the service to the client terminal. As another example, when an accessing client is not the standard web browser but a self client program, various system variables (Mac Address, HDD UUID, and the like) of the client terminal may be used as the client access environment information within a limit permitted by an operating system (OS).

The generation request of the simple authentication number is accepted (received) through a communication interface unit 251 of the authentication server 250 and the user account information or/and client access environment information transmitted together with the generation request may be used as a seed value for generating the simple authentication number.

Referring to step S6 of FIG. 9, according to the generation request of the simple authentication number from the online service server 230, the authentication server 250 generates the simple authentication number. In this case, the simple authentication number may be generated by a simple authentication number generating unit 253 of the authentication server 250.

In this case, the simple authentication number may be generated by using the client access environment information transferred from the online service server 230 as described above. Therefore, hereinafter, other embodiments which may be used while being substituted with the client access environment information or used as an additional seed value for generating the simple authentication number together with the client access environment information will be described in detail.

In an embodiment of the present invention, as the seed value for generating the simple authentication number, a fixation key previously registered to correspond to the user account information of the service user may be used.

As an example, the fixation key corresponding to the user account information may be used by previously registering any one of various user identification information including the user ID, the password, the e-mail address of the user, the phone number, the written authentication password, and the like or a combination of at least ten. As another example, the fixation key corresponding to the user account information may be used by previously registering any one of identifies including a phone number, a product serial number, a USIM card number, a MAC address, and the like of the user's own mobile device (e.g., the smart phone, and the like) or a combination of at least ten. As yet another example, as the fixation key corresponding to the user account information, a personal key personally selected and registered by the user when the user registers a simple authentication service or granted at the time of registering the simple authentication service may be used.

In another embodiment of the present invention, as the seed value for generating the authentication number, a dynamic allocation key dynamically allocated at the time when the user accesses the corresponding online service server may be used.

As an example, as the dynamic allocation key, access terminal connection information of the service user who accesses the corresponding online service server may be used. In this case, as the access terminal connection information, session information (e.g., a session ID, and the like) or socket information (e.g., a socket handle, and the like) allocated to the access terminal of the service user in the corresponding online service server may be used when the service user accesses the online service server.

Herein, the session ID is value granted by the corresponding server in order to manage consecutive data transmission/reception between the server and the access terminal and the socket handle information is a predetermined connection characteristic value which the corresponding server spontaneously allocates in order to manage a socket as a unit to transmit/receive data between the server and the access terminal through a network. Since it is difficult for a hacker to extort the session ID or socket handle information as a value dynamically allocated and spontaneously granted by the corresponding server outside the server, when the session ID or socket handle information is used, it is advantageous in terms of security.

As another example, as the dynamic allocation key, a mobile IP address (may be the entirety or a part of the IP address) which a mobile communication company dynamically allocates to the mobile device owned by the service user may be used. For example, when it is assumed that the service user accesses the corresponding online service server through the mobile device thereof, the mobile IP address dynamically allocated by the mobile communication company may be used as the seed value.

Further, a case in which a specific value is used as the seed value has been primarily described hereinabove, but as the seed value for generating the simple authentication number, a random value spontaneously randomly generated by the authentication server 250 may be used, of course.

As a result, the simple authentication number generating unit 253 of the authentication server 250 uses at least one seed value described above and may generate the simple authentication number by using a time or the number of attempt times (that is, the number of issue attempt times of the simple authentication number) as a calculation condition. For example, the simple authentication number generating unit 253 may be generated as a value acquired by encrypting a value acquired by multiplying at least one seed value by the time or the number of attempt times according to a specific hash function. As a result, the simple authentication number may be generated as a disposable value.

Further, herein, the time OTP scheme is a scheme that generates the OTP by using a generation time as the calculation condition. Therefore, the OTP may be generated with a value acquired by encrypting a value acquired by multiplying the determined specific OTP generation key by the generation time as the calculation condition according to the specific hash function.

As described above, the simple authentication number is generated, the authentication server 250 transfers the simple authentication number generated through step S6 given above through the communication interface unit 251 to the online service server 230 through the communication interface unit 251. The transferred simple authentication number is disclosed to be verified by the user through the screen of the online service site operated by the online service server 230 according to step S9 of FIG. 9. An example thereof is illustrated in FIG. 12. Referring to FIG. 12, it may be verified that the simple authentication number (see reference numeral 30A of FIG. 12) is disclosed through a right authentication number disclosure screen of the online banking site. After the simple authentication number is disclosed on the screen, an approval stand-by state may be continued until verification of the simple authentication number by the user is completed [see step S10 of FIG. 9].

Further, referring to step S8 of FIG. 9, the authentication server 250 allows a generation condition of the simple authentication number to be transmitted to the simple authenticator 220 installed in the service user's own mobile device through the communication interface unit 251.

In FIG. 9, it is illustrated that the simple authentication number condition of step S8 is transmitted through a push server 260, but the present invention is not particularly limited and the authentication server 250 may directly transmit the simple authentication number generation condition to the simple authenticator 220, of course. Further, in FIG. 9, a case in which the simple authentication number generation condition is transmitted through a push message primarily illustrated, but the simple authentication number generation condition may be transmitted based on a transmission scheme by socket data communication.

When the authentication server 250 transmits the simple authentication number generation condition through the push server 260, the authentication server 150 transfers the simple authentication number generation condition to the push server 260 and in this case, the push server 260 may transmit the simple authentication number generation condition to the simple authenticator 220 through the push message. Herein, the push message may be a message service provided for each application in a specific mobile operating system. However, it is apparent that the simple authentication number generation condition need not particularly be transmitted by the push message and the simple authentication number generation condition may be transmitted by various commercial messaging services including SMS, MMS, and the like or a specific communication protocol. In other exemplary cases in which the simple authentication number generation condition is not transmitted by the push message, a function of the push server 260 may be substituted with a function of a general communication server.

Further, in FIG. 9, a case in which the simple authentication number generation condition is directly transmitted to the simple authenticator 220 is primarily described, but the present invention need not particularly limited thereto. For example, it is apparent that the simple authentication number generation condition is transmitted to the mobile device 210 through the push message, and the like and the simple authenticator 220 reads the simple authentication number generation condition to receive (acquire) the simple authentication number generation condition. The simple authentication number generation condition may be received by the communication interface unit 221 of the simple authenticator 220.

The simple authentication number generation condition to be transmitted through step S8 of FIG. 9 may be all seed values and calculation conditions to be used for generating the simple authentication number in step S6 of FIG. 9, but some of the seed values and the calculation conditions. For example, the reason is that when each of the authentication server 250 and the simpler authenticator 220 keeps some of the seed values and the calculation conditions used for generating the simple authentication number in advance and commonly uses the kept some seed values and calculation conditions, the previously kept conditions need not separately be transmitted.

As a result, the simpler authenticator 220 may generate an inspection authentication number for inspecting the simple authentication number displayed through the online service site screen of the online service server 230 by using the received generation condition [see step S11 of FIG. 9]. The inspection authentication number may be generated by an inspection authentication number generating unit 223 of the simple authenticator 220.

The generated inspection authentication number may be displayed on an application screen of the mobile device 210 through an authentication number displaying unit 227 of the simple authenticator 220. In this case, an example in which the inspection authentication number (see reference numeral 30B of FIG. 13) is displayed through the application screen is illustrated in FIG. 13.

Steps S7 to S11 described above need not particularly limited to the order illustrated in FIG. 9 and may be performed in different sequences or simultaneously performed.

When the inspection authentication number is displayed on the application screen through the aforementioned process, the user compares the displayed inspection authentication number and the simple authentication number displayed through the online service site screen to determine that the corresponding online service server is the authentic service server (that is, whether the service server is true).

As a result of the comparison, when the simple authentication number and the inspection authentication number match each other, the user selects the OK button on the application screen illustrated in FIG. 13 to perform approval processing (that is, inspecting completion processing that the corresponding online service server is the authentic service server) [see step S12 of FIG. 9].

A case is illustrated, in which the OK button to perform the approval processing of the corresponding service is provided below the inspection authentication number displayed on the application screen in FIG. 13, but besides, the case may be variously modified, of course. For example, approval or cancellation processing of the corresponding service may be performed by a specific gesture of the user. For example, when the user takes a touch gesture to push up the application screen of the mobile device upwards, the approval processing may be implemented to be performed and when the user takes the touch gesture to push down the application screen downwards, the cancellation processing may be implemented to be performed.

As described above, when approval of the corresponding service is achieved, an additional inspection value generating unit 225 of the simple authenticator 220 generates an additional inspection value and transmits the generated additional inspection value to the authentication server 250 through the communication interface unit 221 [see steps S12 and S13 of FIG. 9].

Herein, the additional inspection value is used for a purpose of user authentication. That is, in the embodiment of the present invention, a scheme is used, which first verifies whether the corresponding service is true through inspection of the simple authentication number and thereafter, verifies whether a user who intends to use the corresponding service is a proper user through the additional inspection value. A peculiar point is that according to the embodiment of the present invention, the additional inspection value for the user authentication is automatically generated by the simple authenticator 220 and immediately transferred to the authentication server 250 while the approval processing through the inspection of the simple authentication number is completed. Therefore, inconvenience that the user needs to personally input a user authentication value in the online service server during the user authentication process may be removed.

In this case, the additional inspection value may be generated by various methods. Since the generation method of the additional inspection value will not be fundamentally different from the generation schemes of the simple authentication number, a detailed description thereof will be omitted. Of course, the generation of the additional inspection value need not follow the generation scheme of the simple authentication number and may be generated according to a predetermined condition defined in a system. The generation scheme will similarly applied even to generation of a verification inspection value (that is, an inspection value generated to correspond to the additional inspection value) in the authentication server 250 to be described below. Accordingly, when information which is not kept in the authentication server 250 is used during the generation process of the additional inspection value, the corresponding information needs to also be transferred to the authentication server 250 through step S13 of FIG. 9.

Further, it is illustrated in FIG. 9 that the transmission of the additional inspect value according to step S13 is achieved via the push button 260, but the present invention need not particularly be limited thereto and the additional inspection value may be transmitted even by a scheme that directly transmits the additional inspection value to the authentication server 250.

As a result, a verification inspection value generating unit 255 of the authentication server 250 generates a verification inspection value for verifying the additional inspection value and an authentication processing unit 257 of the authentication server 250 compares whether the generated verification inspection value and the transmitted additional inspection value match each other to perform the user authentication of the corresponding service user [see step S14 of FIG. 9]. In this case, an authentication result may be notified to the online service server 230 [see step S15 of FIG. 9] and when the authentication is normally achieved, the online service server 230 may start the corresponding service to the corresponding service user [see step S16 of FIG. 9].

According to the embodiment of the present invention described above, since the service user just performs only the service inspection through the simple authentication number and the subsequent user authentication process is automatically performed, a user authentication number input process may be omitted, and as a result, it is advantageous in that a total authentication procedure is simplified and convenient.

Hereinabove, the case has been primarily described, in which the corresponding service is normally approved through step S12 of FIG. 9. However, when the corresponding service is disapproved by the user through step S12 of FIG. 9, the simple authenticator 220 may give disapproval notification through step S13 of FIG. 9.

Further, according to the embodiment of the present invention, after the simple authentication number is generated according to the access attempt to the online service server by the service user, the authentication server 250 may just maintain the generated simple authentication number for an inspection valid time (e.g., 60 seconds) for the simple authentication number or until the service inspection by the user is completed. A description thereof will be made below with reference to FIG. 14.

Referring to FIG. 14, when the simple authentication number is generated with a service access by a normal user and thereafter, a posterior access by a hacker which extorts the user account information of the corresponding user is achieved [see step S21 of FIG. 14], even though the generation request of the simple authentication number by the online service server 230 is additionally accepted [step S22 of FIG. 14], the authentication server 250 prevents regeneration of the authentication number [see step S23 of FIG. 14].

As described above, the authentication server 250 may maintain the simple authentication number generated according to an anterior access or prevent new generation of the simple authentication number according to the posterior access for the inspection valid time of the simple authentication number or until inspection of the online service server is completed. In respect to the posterior access, a screen (see reference numeral 30C of FIG. 15) guiding that a duplicative access is impossible may be displayed through the screen of the online service site illustrated in FIG. 15. Therefore, illegal user authentication depending on the posterior access by the hacker and information extortion thereby may be prevented.

Hereinabove, the case has been primarily described, in which the user accesses the online service server through the client terminal apart from the user's own mobile device. However, the simple authenticator may directly access the online service server by using the installed mobile device as described above. In this case, the simple authentication number and the inspection authentication number may be displayed through the screen of the mobile device as illustrated in FIGS. 16 and 17. Referring to FIG. 16, the application screen by the simple authenticator 220 is displayed on a screen top 40A of the mobile device and a site screen provided by the online service server 230 is displayed on a screen bottom 40B of the mobile device. In addition, a simple authentication number 40C is displayed on the screen bottom 40B. Further, referring to FIG. 17, an inspection authentication number 40D generated by the simple authenticator 220 is displayed on the screen top 40A. When the simple authenticator directly accesses the online service server by using the installed mobile device as described above, the application screen by the simple authenticator and the site screen by the online service server may be separated and displayed in different screen areas. As such an example, in particular, a case is illustrated in FIGS. 16 and 17, in which the application screen is displayed in such a manner that the application screen floats on the top of the site screen (that is, layered type screen display), but a screen division scheme may adopt various schemes other therethan, of course.

According to the embodiment, after the user inputs an ID and a password in the online service, the simple authentication number provided by the service and the simple authentication number provided by the mobile simple authenticator are the same as each other for additional authentication, the service access of the user is approved to remove unnecessary authentication number reinput of the user.

Further, according to the embodiment, when other people attempts the access to the online service with the ID and the password of the user, the user having the simple authenticator may be aware of a situation in which an access permission request is made not personally but by other people to enable security management for the ID and the password of the user.

Third Embodiment—Method and System of User Authentication Using Access Terminal Connection Information The embodiment relates to a method and a system of user authentication, and more particularly, to a method and a system of authentication, which authenticate a user by using a one time password (OTP) generated by using connection information of an access terminal.

An OTP application based on a smart phone is generalized in order to protect an important information service such as online banking or a mail service, but an attack level for extorting an OTP value generated on a smart phone screen is advanced.

Even though security of the OTP application generated in the smart phone is excellent, when the hacker attacks an OTP value which the normal user generates with a smart phone thereof by screen scraping software to remotely read the screen or remotely reads the smart phone screen and first inputs and uses the OTP value in a terminal of the hacker, information of the corresponding system may read or a key transaction such as fund transfer may be intercepted.

Further, when various electronic money types of barcode systems generated by applying an OTP technology are displayed on the screen, in the case where the systems are extorted by the hacker to be pirated within a limited time, a serious problem for a normal authentication system may be caused.

In particular, since a conventional security technology may not prevent a person from visually reading the screen or a barcode recognizer to read the screen, when a screen made by an OPT generator application is pirated by the hacker within an OTP input valid time, there is a problem in that the pirating may not be prevented.

Further, in conventional prior arts associated with the OTP and the session, the OTP value is used in order to authenticate the session accessed by the user terminal and a technological structure that authenticates different OTP values for each accessing terminal is not provided.

Therefore, required is an enhanced authentication security technology that allows the user to safely use the online service by using the mobile OTP application anytime anywhere.

The embodiment provides a method and a system which generates an OTP by using connection information of an access terminal which accesses the corresponding service and validate the corresponding OTP only in a connected access terminal in order to safely use information service such as the online banking, or the like.

In the following description, as an OTP generator, a software OTP generator installed in a mobile device owned by the user in the form of an application program is primarily described, but the present invention is not particularly limited thereto, of course. For example, the OTP generator may be a hardware OTP generating device having a communication function. However, hereinafter, the embodiment of the present invention will be described by assuming an electronic case for convenience and concentration of the description.

Further, hereinafter, a case is assumed and described, in which a client terminal as an access terminal which accesses the online service server and the OTP generator are physically separately configured based on FIG. 18, but the OTP generator may be implemented integrally with the client terminal. In the latter case, the mobile device illustrated in FIG. 18 will be omitted. Further, it is apparent that the client terminal itself may be the mobile device.

FIG. 18 is a diagram for describing a method and a system of user authentication according to an embodiment of the present invention. Further, FIG. 19 is a block diagram of an embodiment of an online service server associated with the user authentication method according to the embodiment of the present invention, FIG. 20 is a block diagram of an embodiment associated with an OTP authentication server implementing the user authentication method according to the embodiment of the present invention, and FIG. 21 is a block diagram of an embodiment associated with an OTP generator implementing the user authentication method according to the embodiment of the present invention. Hereinafter, the method and the system of user authentication according to the embodiments of the present invention will be described in detail with reference to FIGS. 19 to 21 together based on FIG. 18.

Referring to step S1 of FIG. 18, when the service user intends to use the online service by the online service site provided by the online service server 330, the service user requests accessing the online service server 330.

For example, when the online service which the service user intends to is an online banking service, the user may access a specific online service server (that is, a specific bank server providing the online banking service) that provides the corresponding online banking service. The access to the online service server 330 may be achieved by a mobile access through a mobile device 310 (e.g., a smart phone, and the like) owned by the user, of course, but in FIG. 18, it is illustrated that the user accesses the online service server 230 through a client terminal 300 (e.g., a company PC, and the like) apart from the user's own mobile device 310.

Referring to step S2 of FIG. 18, according to the access request to the online service server 330, the online service server 330 may request input of user account information to the service user which intends to use the online service. Herein, the user account information means identification information of the corresponding user which the corresponding online service server 330 previously stores (registers) through a user registration procedure (alternatively, a service joining procedure). In genera, as the user account information, a user identifier (ID) and a password may be used. However, in the case of information to identify the user who uses the corresponding online service, various information (e.g., an e-mail address, a phone number, a written authentication password on a written authentication based on a public key infrastructure (PKI), and the like) may be substituted and used as the user account information in addition to the corresponding information.

Referring to step S3 of FIG. 18, according to the input request of the user account information, the service user inputs the user account information in the corresponding online service site. Referring to step S4 of FIG. 18, when the user account information is input from the service user, the online service server 330 verifies whether an account matching the user account information input by the user is present. An account DB 340 illustrated in FIG. 18 may be used for verifying the account information. Account information on users (that is, members) who may receive the online service through the corresponding online service server 330 is kept in the account DB 340. In FIG. 18, a case is illustrated, in which the account DB 340 is provided apart from the online service server 330, but the account DB 340 may be implemented while being integrated with the online service server 330.

Further, according to a system implementation scheme, the account DB 340 may be implemented to be integrated with an OTP authentication server 350. In such a case, the user account information verifying procedure in step S4 of FIG. 18 may be executed after the user account information is transmitted to the OTP authentication server 350 according to step S5 of FIG. 18 to be described below. However, in the present specification, the embodiment of the present invention will be described based on FIG. 18 for concentration of the description.

Referring to step S5 of FIG. 18, when the input user account information matches the user account kept in the account information DB 340, the online service server 330 may transmit the access terminal connection information and the user account information to the OTP authentication server 350 through the communication interface unit 331.

Herein, the access terminal connection information transmitted from the online service server 330 to the OTP authentication server 350 may be server-terminal connection information, when the service user accesses the online service server 330 by using the access terminal (the client terminal 300 in FIG. 18), generated and managed by the online service server 330 in order to manage consecutive data transmission/reception between both parties.

Therefore, as the access terminal connection information, session information (e.g., a session ID, and the like) or socket information (e.g., a socket handle, and the like) in socket data communication, which is allocated to the access terminal of the service user in the corresponding online service server may be used when the service user accesses the online service server. The access terminal connection information may be allocated by a connection information setting unit 333 of the online service server 330.

Herein, the session ID is value granted by the corresponding server in order to manage consecutive data transmission/reception between the server and the access terminal and the socket handle information is a predetermined connection characteristic value which the corresponding server spontaneously allocates in order to manage a socket as a unit to transmit/receive data between the server and the access terminal through a network. Since it is difficult for a hacker to extort the session ID or socket handle information as a value dynamically allocated and spontaneously granted by the corresponding server outside the server, when the session ID or socket handle information is used as the seed value for the OTP generation hereafter, it is advantageous in terms of security.

Further, the user account information to be transmitted from the online service server 330 to the OTP authentication server 350 may be any one or some of various user account information described above. For example, in step S5 of FIG. 18, the online service server 330 may transmit to the OTP authentication server 350 only an ID of the service user as the user account information. In this case, the user account information is transmitted to the OTP authentication server 350 for a purpose to identify a target (the service user's own mobile device 310 or the OTP generator 320 in FIG. 18) to which the access terminal connection information is transmitted hereafter in the OTP authentication server 350. Accordingly, the user account information to be transmitted according to the step may be variously modified within a limit to achieve an object thereof.

In FIG. 18, it is illustrated that this step (that is, step S5) is executed immediately after the previous user account verifying procedure (that is, step S4), but the execution order may different therefrom, of course. For example, this step may be executed only when the user selects the OTP authentication scheme as an authentication means after the user account verifying procedure is completed.

As described above, the transmitted access terminal connection information and user account information are accepted (received) through the communication interface unit 351 of the OTP authentication server 350.

Further, when the user account information verifying procedure is normally completed according to step S4 of FIG. 18, the online service server 330 may request input of the user OTP to the service user by a scheme that displays the user OTP input window through the screen of the online service site, and the like according to step S6.

In this case, steps S5 and S6 of FIG. 18 may be simultaneously executed and performed in different sequences unlike the order illustrated in FIG. 1. Similarly thereto, step S6 of FIG. 18 and step S7 to be described below may be simultaneously executed in different sequences unlike the order illustrated in FIG. 18.

Further, according to the embodiment of the present invention, when the access terminal connection information is received, the OTP authentication server 350 transmits the corresponding access terminal connection information to the OTP generator 320 installed in the service user's own mobile device 310 through the communication interface unit 351 according to step S7 of FIG. 18.

In step S7 of FIG. 18, it is illustrated that the access terminal connection information is transmitted through a push server 360, but the present invention is not particularly limited thereto and the OTP authentication server 350 may directly transmit the access terminal connection information to the OTP generator 320, of course.

When the OTP authentication server 350 transmits the access terminal connection information through the push server 360, the OTP authentication server 350 transfers the access terminal connection information to the push server 360 and in this case, the push server 360 may transmit the access terminal connection information to the OTP generator 320 through the push message. Herein, the push message may be a message service provided for each application in a specific mobile operating system. However, it is apparent that the access terminal connection information need not particularly be transmitted by the push message and the access terminal connection information may be transmitted by various commercial messaging services including SMS, MMS, and the like or a specific communication protocol (e.g., socket data communication, or the like). In other exemplary cases in which the access terminal connection information is not transmitted by the push message, a function of the push server 360 may be substituted with a function of a general communication server.

Further, in FIG. 18, a case in which the access terminal connection information is directly transmitted to the OTP generator 320 is primarily described, but the present invention is not particularly limited thereto. For example, it is apparent that the access terminal connection information is transmitted to the mobile device 310 through the push message, and the like and the OTP generator 320 reads the access terminal connection information to receive (acquire) the access terminal connection information. The access terminal connection information may be received by an access terminal connection information receiving unit 321 of the OTP generator 320.

For the transmission of the access terminal connection information to the OTP generator 320, the OTP authentication server 350 may verify a device value of the mobile device 310 in which the OTP generator 320 is installed or an application push ID of the OTP generator 320 based on the user account information received from the online service server 330 and transmit the access terminal connection information to the OTP generator 320 based on the verified device value or application push ID.

As another example, the OTP authentication server 350 may transmit to the OTP generator 320 the access terminal connection information as a response to the request of the OTP generator 320. For example, when the input of the user OTP is requested according to step S6 of FIG. 18, the service user that recognizes the request requests transmission of the access terminal connection information to the OTP authentication server 350 through the OTP generator 320, and as a result, the OTP authentication server 350 may transmit to the OTP generator 320 the access terminal connection information as a response thereto.

As yet another example, unlike the example of FIG. 18, when the access terminal is the mobile device 310 in which the OTP generator 320 is installed, the OTP authentication server 350 may verify the application push ID of the OTP generator 320 based on the received user account information, requests the transmission of the access terminal connection information allocated to the mobile device 310 as the access terminal to the online service server 330 based on the verified application push ID, and transmit the access terminal connection information received according to the transmission request to the OTP generator 320. That is, in such a case, the system will be implemented in such a scheme that only the user account information is first transmitted in step S5 of FIG. 18 and the access terminal connection information is later transmitted according to the request of the OTP authentication server 350.

According to the aforementioned various schemes, when the access terminal connection information is transmitted to the OTP generator 320, the OTP generator 320 generates the user OTP according to step S8 of FIG. 18. In this case, the user OTP may be generated by using the transmitted access terminal connection information and executed by a user OTP generating unit 325 of the OTP generator 320. Hereinafter, various embodiments of a user OTP generating method using the access terminal connection information will be described in detail.

In an embodiment, the OTP generating unit 325 uses the received access terminal connection information as the seed value and applies a specific calculation condition (e.g., the number of attempt times, a time, or the like) to generate the user OTP. In more detail, the OTP generating unit 325 may generate the user OTP with a value acquired by encrypting a value acquired by multiplying the received access terminal connection information by the specific calculation condition according to a specific hash function.

In another embodiment, the OTP generating unit 325 further adds another specific key value in addition to the access terminal connection information as the seed value to generate the user OTP. In this case, a personal key previously registered to correspond to the user account information of the service user may be used as the another specific key value.

As an example, the personal key corresponding to the user account information may be used by previously registering any one of various user identification information including the user ID, the password, the e-mail address of the user, the phone number, the written authentication password, and the like or a combination of at least nineteen. As another example, the personal key corresponding to the user account information may be used by previously registering any one of identifies including a phone number, a product serial number, a USIM card number, a MAC address, and the like of the user's own mobile device (e.g., the smart phone, and the like) or a combination of at least nineteen. As yet another example, as the personal key corresponding to the user account information, a personal key personally selected and registered by the user when the user registers the OTP authentication server or granted at the time of registering the OTP authentication service may be used.

The personal key used for generating the user OTP may be previously stored in a key keeping unit 323 of the OTP generator 320. In this case, the personal key stored in the key keeping unit 323 of the OTP generator 320 is similarly stored even in a key keeping unit 353 of the OTP authentication server 350 to be used similarly in mutual OTP generation.

In addition to the embodiments described as above, more various values may be additionally used as the seed value for generating the OTP or substitutively used, of course. Further, the case in which the OTP is generated by using the key value kept in the OTP generator 320 has primary described hereinabove, but the kept key value need not particularly be used. For example, when the access terminal connection information is transmitted through step S7 of FIG. 18, the key value to be additionally used for generating the OTP or the specific calculation condition may be together transmitted to the OTP generator 320. Alternatively, a scheme may be used, which transmits to the OTP authentication server 350 the key value additionally used for generating the OTP in the OTP generator 320 or the calculation condition.

When the user OTP is generated according to the aforementioned step, an OTP displaying unit 327 of the OTP generator 320 displays the generated user OTP through the screen of the mobile device 310.

Thereafter, when the user OTP is input through step S9 of FIG. 18, an authentication requesting unit 335 of the online service server 330 transfers the user OTP input by the service user to the OTP authentication server 350 through the communication interface unit 331 [see step S10 of FIG. 18] to request inspection of the input user OTP.

In this case, the input of the user OTP by the service user may be achieved through the user OTP input window disclosed on the online service site screen provided by the online service server 330. Of course, besides, the input of the user OTP may be modified by various schemes. For example, the user OTP is not personally input by the service user and may be input through a specific gesture. For example, various gestures including an action in which the user just touches and selects the user OTP displayed through a touch screen of the mobile device, a touch gesture to push up the corresponding screen upward, and the like are taken, and as a result, the user OTP may be implemented to be automatically input.

As a result, an inspection OTP generating unit 355 of the OTP authentication server 350 generates an inspection OTP corresponding to the input user OTP [see step S11 of FIG. 18]. In this case, since a generation scheme of the inspection OTP is fundamentally the same as the aforementioned user OTP generation scheme, a duplicated description thereof will be omitted. Herein, the inspection OTP generation according to step S11 of FIG. 18 need not particularly be executed after step S11 of FIG. 18 and may be executed at a predetermined time after step S5 of FIG. 18 according to a system implementation scheme.

When the inspection OTP is generated as described above, the authentication processing unit 357 of the OTP authentication server 350 compares whether the transferred user OTP and the spontaneously generated inspection OTP match each other to perform the user authentication for the corresponding service user. In this case, the authentication result is notified (transmitted) to the online service server 330 through the communication interface unit 351 [see step S12 of FIG. 18].

As a result, when the authentication is normally achieved by referring to the notified authentication result, a service processing unit 337 of the online service server 330 may start the corresponding service to the corresponding service user [see step S13 of FIG. 18].

According to the embodiment, provided are a method and a system for generating an OTP, which generate the by using connection information of an access terminal which accesses the corresponding service and validate the corresponding OTP only in a connected access terminal in order to safely use information service such as the online banking, or the like. As a result, even though an OTP value is leaked by the hacker, the authentication is achieved only in the server access by the corresponding access terminal.

Fourth Embodiment—Driving Environment
Inspection Method of OTP App and Authentication
System Thereof The fourth embodiment relates to a driving environment inspection method of an OTP app and an authentication system using the same. More particularly, the fourth embodiment relates to a method and a system for generating an OTP by a replicated app and preventing authentication through the generated OTP from being performed even though a software type OTP app is replicated from an initially registered mobile device to another devices.

Generally, in the hardware dongle type, a security effect is high, but portable inconvenience and costs occurs. In the software type, economics and portability are good, but the software itself may be replicated to be vulnerable to the security.

Particularly, since a mobile app can be replicated from an initially installed device to another device, various techniques for preventing the replication have emerged. As an example, after the OTP app is installed in a smart device, unique values (a unique device identifier (UDID), a phone number, a push ID, and the like) of the smart device which are initially installed in a user registration process are stored in a server. Whenever the app is driven, there is a method driven when the unique values of the smart device are transmitted to the server to be matched with the stored unique values. As another example, the unique values of the device during the OTP app registration are switched to hash values and stored, and then, the real-time hashed unique values and the stored hash values are compared with each other every the driving time of the OTP app. There is a method of verifying whether the corresponding device is the initially installed device (that is, the same device as the device during the app registration).

However, in the former method among the aforementioned methods, there is a problem in that the OTP app is replicated and driven by a simple method of newly generating an app after removing a condition part that verifies the unique values by decompiling the app. Further, in the latter method among the aforementioned methods, there is a problem in that when a hacker operates the app after changing (reconfiguring) the unique values of the own smart device to the unique values of the original device with the installed app, the corresponding app is normally driven.

Further, in addition to the above methods, even though an app forgery prevention technology is additionally mobilized, when a value for the environment in which the app is driven other than the forgery of the app itself is modulated, the app is regarded as the normal smart device and operates. Further, since app forgery detection methods recognize a common binary area of the app, even though a data area having unique values for each user like authentication software is modulated, there is a limit that the modulation may not be detected.

Accordingly, a method and a technique capable of inspecting a driving environment so that the OTP app may be normally driven only in the initially installed and registered smart device are required.

The present embodiment is provide a method and a system of preventing a normal OTP value from being generated even though the OTP app is replicated by the hacker by generating the OTP value after verifying whether the software type OTP app is driven in the initially installed and registered smart device.

Hereinafter, the embodiment of the present invention will be described in detail with reference to FIGS. 23 and 24 based on FIG. 22. Herein, FIG. 22 is a diagram for describing a driving environment inspection method of the OTP app according to an embodiment of the present invention and an authentication system using the same, and FIGS. 23 and 24 are block diagrams of an embodiment for an OTP app and an OTP authentication server for implementing the driving environment inspection method of the OTP app according to the embodiment of the present invention.

Hereinafter, the OTP app means a software type OTP generator which is installed in an application program form in a user's own mobile device (see reference numeral 410 of FIG. 22). Further, of course, the embodiment of the present invention to be described below may be applied to various online services which are used as an authentication means of the OTP regardless of a kind of service. Further, hereinafter, the present invention will be described based on a case where the OTP is used for the user authentication, but if the OTP is used for special authentication, it is natural that the present invention may be applied without a particular limitation. However, hereinafter, when describing the embodiment of the present invention, for convenience and concentration of description, it is assumed that a user accesses a specific online service server (see reference numeral 430 of FIG. 22) that provides the corresponding service for using an online banking service and selects the OTP authentication as a user authentication means.

As such, when the OTP authentication is selected as the authentication means for using the online service provided by the online service server 430, the user drives the OTP app 420 installed in the user's own mobile device for inputting a user OTP value as an authentication value.

Accordingly, when the app is driven like step S1 of FIG. 22, the OTP app 420 according to the embodiment of the present invention executes a series of processes for inspecting the app driving environment. That is, the OTP app according to the embodiment of the present invention does not immediately generate the OTP according to the app driving, but performs a process of inspecting the driving environment in which the corresponding app is driven before generating the OTP and may generate the OTP value only when the inspection of the app driving environment is normally completed. Hereinafter, a series of processes for inspecting the app driving environment will be described with reference to steps S2 to S7 of FIG. 22.

Referring to step S2 of FIG. 22, the driving environment inspecting unit 423 of the OTP app 420 transmits an app push ID and basic registration information to the OTP authentication server 450 through the communication interface unit 421.

The app push ID generally means a unique value (for example, a push token and the like) allocated for each app installed for transceiving the data through a push messaging service with the app in a specific mobile operating system (for example, a mobile operating system of Google or Apple corporation). Accordingly, even though the same app is installed, if the installed device varies, the app push ID varies. The app push ID transmitted to the OTP authentication server 450 through the step S2 is a push ID for the corresponding app which is registered by the user at the time of initially subscribing to the OTP authentication service by the OTP authentication server 450.

In the embodiment, the app push ID may be stored in the OTP app 420 and then transmitted to the OTP authentication server 450 through the step S2. Alternatively, according to another embodiment, whenever the app driving environment inspection is required (that is, whenever the OTP app is driven), a method of receiving the app push ID value from an operating server (that is, a management server of Google or Apple corporation) of the corresponding mobile operating system to transmit the received app push ID value to the OTP authentication server 450 may be used. According to the latter method, since the app push ID value needs to be received all the time, even though the OTP app is replicated by the hacker, the app push ID may not be received through the hacker's device other than the normal device. Accordingly, in the case of the latter method, the security may be further enhanced as compared with the former method (a method in which the app push ID is stored in the app itself).

Further, the basic registration information, as information registered when the user initially subscribes to the OTP authentication service, may use any one of information (for example, user identification information, additional input information which is additionally input by the user at the time of subscribing to the OTP authentication service, or the like) capable of verifying a legitimate user subscribing to the corresponding OTP authentication service, OTP app information (for example, an app serial number, OTP identification information, an OTP app code, and the like) registered at the time of registering the OTP app to the authentication server, and mobile device information (for example, UDID, a USIM card number, a MAC address, and the like) installed with the OTP app, or a combination thereof.

The aforementioned app push ID and basic registration information are stored even in an information registering unit 453 of the OTP authentication server 450 to be used for the driving environment inspection of the OTP app hereafter. Until the app driving environment inspection according to the embodiment of the present invention is completed, the driving environment inspecting unit 423 of the OTP app 420 may display a driving environment inspection idle screen on the app screen [see step S3 of FIG. 22]. Herein, the driving environment inspection idle screen means a screen displayed on the screen of the mobile device for guiding to the user a situation in which the app driving environment is inspected until a push message according to step S6 of FIG. 22 to be described below is transmitted from the OTP authentication server 450.

According to step S2 of FIG. 22, when the app push ID and the basic registration information is received through the communication interface unit 451 of the OTP authentication server 450, in step S4 of FIG. 22, the OTP authentication server 450 verifies whether the app push ID stored in the information registration unit 453 and the basic registration information, and the received app push ID and the basic registration information are matched with each other.

As the verified result, when the app push ID and the basic registration information are matched with each other, it may be verified that the environment in which the OTP app is driven is not different from the environment registered at the time of subscribing to the OTP authentication service (that is, the mobile device in which the corresponding OTP app is driven is the same as the initially registered device). In other words, it may be verified that the OTP app is replicated to another device and not pirated.

As the verified result of step S4 of FIG. 22, when the match between the information is verified, the OTP authentication server 450 may additionally perform a secondary inspection process according to step S5 of FIG. 22. Of course, the secondary inspection process according to step S5 of FIG. 22 may be omitted according to a system implementation method, but hereinafter will be described as follows.

Referring to step S5 of FIG. 22, the OTP authentication server 450 verifies whether an IP address of an access mobile device (that is, the device installed with the OTP app 420) is in a range of IP addresses of a communication company pre-registered in the information registration unit 453. Herein, the pre-registered communication company IP address range represents an IP address range allocated by a communication provider providing a mobile communication service when the mobile device subscribing to the its own mobile communication service performs the IP communication.

If the IP address of the mobile device transmitting the app push ID and the basic registration information to the OTP authentication server 450 is not present in the IP address range allocated by the mobile communication service operator related with the initially registered mobile device, use positions of the devices are different from each other, and thus, the possibility of access with unjustifiable purpose by other person (hackers and the like) stealing device information is high. Accordingly, in this case, it is required to reject authentication on the security. As such, step S5 of FIG. 22 is a process for additionally inspecting a position range where the corresponding device is used beyond the device inspection of the previous step (step S4).

With regard to this, the OTP app 420 may manage that the app is not driven in a short-range communication mode such as WiFi and the app is driven only in the mobile communication network including 3G, LTE, or the like by checking the network setting when the app is driven. The checking of the network setting may be performed by the communication network verifying unit 420 of the OTP app 420.

As the result through the verified process described above, when there is no mismatch between the information, the OTP authentication server 450 transmits an OTP generation condition value to the OTP app 420 based on the app push ID which has been received through step S2 of FIG. 22 (see step S6 of FIG. 22).

In FIG. 22, the case where the transmission of the OTP generation condition value is performed through a push message based on the app push ID is described. However, it is not limited thereto, and it is obvious that various transmission protocols or various message transmission modes such as socket data communication may be used.

If the OTP generation condition value is transmitted through the push message based on the app push ID, step S6 of FIG. 22 may be performed by the following method. First, the OTP authentication server 450 transmits the OTP generation condition value to the mobile device 410 in which the corresponding OTP app 420 is installed through a push server (not illustrated). In this case, the OTP app 420 reads the push message transmitted to the mobile device 410 to verify the OTP generation condition value.

As described above, even though the OTP app is replicated by the hacker and the normal push ID and the basic registration information is received to the OTP authentication server 450, the OTP generation condition value is transferred to the mobile device of the authentic user other than the device of the hacker through step S6 of FIG. 22. Accordingly, the device of the hacker may not generate the OTP value for authentication without receiving the OTP generation condition value.

When the OTP generation condition value is transferred through the previous step, the OTP generating unit 427 of the OTP app 420 generates the OTP by using the OTP generation condition value and the OTP displaying unit 429 of the OTP app 420 may display the generated OTP on the screen (see step S7 of FIG. 22).

Herein, the OTP generation condition value transmitted to the OTP app 420 may be a value allocated or stored by an OTP generation condition setting unit 455 of the OTP authentication server 450. For example, the OTP generation condition value may be a variable value such as a time value, a random value In this case, the OTP generating unit 427 generates the OTP value by using the variable value as an operator when generating the OTP in the case of receiving the variable value as the received OTP generation condition value or may generate the OTP value when the received fixed value is compared with the reference value in the app and the same as the reference value in the case of receiving the fixed value. Herein, some of the generation condition values used in the OTP generation in the OTP generating unit 427 may also use the value pre-stored in the OTP app as it is.

Thereafter, when the OTP value is input through step S8 of FIG. 22, the online service server 430 may request the inspection of the input OTP value by transferring the OTP input by the user to the OTP authentication server 450 (see step S19 of FIG. 22).

In this case, the input of the OTP value by the service user may be performed through an OTP input window published on an online service site screen provided by the online service server 430. Of course, in addition, the input may be modified by various methods. For example, the OTP value is not directly input by the service user and may be input through a specific gesture. For example, when the user takes various gestures such as an action of just touching and selecting the OTP displayed through a touch screen of the mobile device, a touch gesture to push up the corresponding screen upward, and the like, and as a result, the OTP may be implemented to be automatically input.

As a result, the authentication processing unit 457 for inspection of the OTP authentication server 450 generates the OTP for inspection corresponding to the input OTP and performs the authentication for the corresponding service user by comparing whether the transferred OTP is matched with the self-generated OTP for inspection (see step S10 of FIG. 22). In this case, the authentication result may be notified (transmitted) to the online service server 430 through the communication interface unit 451. As a result, the online service server 430 may indicate the corresponding service to the corresponding service user when the authentication is normally performed with reference to the notified authentication result.

Hereinabove, the present invention is described base on the case where it is determined that the app driving environment inspection result is a normal driving environment. On the contrary, the following process may be performed in the case where it is determined that the app driving environment inspection result is an abnormal driving environment. Hereinafter, various examples therefor will be described.

According to an example, as the verified result of steps S4 and S5 of FIG. 22 described above, when the mismatch between the information occurs even in any one step, the OTP authentication server 450 may not perform step S6 of FIG. 22 described above. In this case, the OTP app 420 may display a message of forcibly ending the app or guiding the end on the screen, when a massage according to step S6 of FIG. 22 dose not arrive within a predetermined time after step S2 of FIG. 22.

According to another example, as the verified result of steps S4 and S5 of FIG. 22 described above, when the mismatch between the information occurs even in any one step, the OTP authentication server 450 may transmit an authentication disapproval notification to the online service server 430. In this case, the OTP authentication server 450 may transmit a guide message related with the authentication disapproval or a warning message warning the replication of the OTP app by other person to the authentic user based on the stored push ID.

Further, the OTP authentication server 450 may transmit the authentication disapproval notification to the online service server 430 when the OTP value is transferred according to step S9 of FIG. 22, while the push ID and the basic registration information according to step S2 of FIG. 22 are not received. The reason is that this is the abnormal authentication request received while the app driving environment inspection process according to the embodiment of the present invention is not performed.

According to the embodiment, even though an alternative attack in which the information on the environment where the app is driven is modulated is attempted by the hacker instead of an attack of the app itself, the normal OTP value may not be generated.

Accordingly, according to the embodiment, the normal OTP value is generated only in the initially installed and registered smart device to implement the software type OTP app with the same-leveled security as the hardware OTP dongle.

[Fifth Embodiment—Method of Driving OTP App] (Network Deactivation)

The fifth embodiment relates to a method of preventing the OTP application from being stolen by a third person, when the software type OTP application is driven in the user terminal. More particularly, the fifth embodiment relates to a method verifying whether the network is deactivated when the OTP application is driven and executing the OTP application when the network is deactivated.

It has been considered that financial transaction using the OTP is safe, but recently, when considering the internet banking hacking accidents, even though the user makes a normal transaction in a transaction terminal, a memory hacking attack that modulates a transaction account has occurred.

The memory hacking attack means a hacking attack in which transaction account information is modulated and transmitted to another account, when the data is transmitted to the transaction server from the transaction terminal, even though the user inputs a transaction account, a remittance, and an OTP token value in an online transaction medium.

In order to prevent the memory hacking attack, a transaction related OTP generating the OTP token value is applied to the financial institutions abroad by already receiving the transaction account and the transaction amount of money in an OTP generation algorithm. The transaction related OTP technique is a technique of generating the OTP token value by additionally receiving transaction information (the transaction account and the remittance) to an existing OTP technique of generating the OTP token value by operating time or the number of times of attempts to an individual OTP unique value. Accordingly, even if the memory hacking attack occurs in the transaction terminal, when the transaction information is not the remittance account and the remittance suitable of the transaction related OTP, the transaction may not be performed.

However, the transaction related OTP is constituted by a hardware-based OTP having higher security than the software type with excellent economics and portability. The reason is that the attack to the user terminal may be up to an attack of the operation environment itself other than a level of just phishing the app. Representatively, when the user drives the app in the user terminal, the user may transmit an input value or an output result value or the screen itself to the outside and an external hacker dominates the user terminal of the user through a remote control technique to drive the user terminal remotely.

Accordingly, even while the software type transaction related OTP is safely driven in the user terminal, new alternatives that can protect the transaction itself are required.

The embodiment provides a computer-implemented method for the OTP application capable of preventing a hacking risk in the driving process of the software type OTP application.

Further, the embodiment provides a computer-implemented method for the OTP application capable of prevent the OTP token value from being leaked through the hacking software when the transaction related OTP application is installed or driving in the user terminal.

FIG. 25 is a diagram illustrating a functional block of the transaction related OTP application as an embodiment of the present invention, and FIG. 26 is a schematic flowchart for a method of driving the OTP application according to the embodiment of the present invention. In addition, FIGS. 27 to 31 are diagrams exemplifying execution screens of the transaction related OTP application as the embodiment of the present invention.

Through the accompanying drawings of this specification, a case of an OTP application that generates a transaction related OTP (that is, an OTP used for security of the financial transaction) will be assumed, illustrated, and described. However, it can be easily understood to those skilled in the art that the method of driving the OTP application according to the embodiment of the present invention may be equally or similarly applied to a variety of other OTP generation applications. Accordingly, in the present specification, the case of the transaction related OTP will be primarily described for convenience and concentration of the description.

Referring to FIG. 25, according to the embodiment of the present invention, as an example of the OTP application installed in the user terminal, a transaction related OTP application 500 (hereinafter, abbreviated as "a transaction related OTP app") may include a network verifying unit 510, a transaction information storing unit 520, an OTP generating unit 530, a graphic user interface (GUI) screen displaying unit 540, and a control unit 550. Hereinafter, functions of respective components of FIG. 25 will be described with reference to a flowchart of FIG. 26 and exemplary screens of FIGS. 27 to 31 together.

The network verifying unit 510 serves to verify a network connection state of the user terminal when the transaction related OTP app is initially driven, so that the transaction related OTP app is driven while the network connection is deactivated. Accordingly, like step S210 of FIG. 26, when the driving request of the transaction related OTP app is received according to the selection of the user, the network verifying unit 510 verifies whether the network connection of the user terminal is in a deactivated state (see step S220 of FIG. 26).

Herein, the network deactivated state may be set as a case where all network devices (as an example, 3G, LTE, WiFi, Bluetooth, NFC, and the like) mounted on the user terminal is in the deactivated state, but may also be set as a case where only a network requiring the allocation of an internet protocol (IP) address for network connection is in the deactivated state.

In the latter case described above, when the driving request of the transaction related OTP app by the user is received, the network verifying unit 510 verifies whether a network where the IP address is allocated to the user terminal is present and may determine that the network is deactivated when the network where the IP address is allocated is not present. That is, the above latter case, even though a short-range wireless communication network including Bluetooth, NFC, or the like which is communicable with the outside without allocation of the IP address is activated, when the network requiring the IP address allocation is in the deactivated state, it is determined that the network in step S220 of FIG. 26 is in the deactivated state.

As another example, the network verifying unit 510 may also determine that the network connection is in the deactivated state, when an address system allocated to the network device is a loopback address, in a method of recognizing a network state value. The loopback address is 127.0.0.1 as an address allocated to the network device and may be ::1 or 0:0:0:0:0:0:0:1 as an IPv6 address.

As described above, when applying the method of driving the OTP application according to the embodiment of the present invention, details regarding how the network deactivated state is defined may vary according to a configuration of the application.

The control unit 550 controls whether to drive the transaction related OTP app or/and to execute the function according to the app driving depending on the verified result of the network verifying unit 510. First, as the verified result of step S220 of FIG. 26, when it is verified that the network is in the deactivated state, the control unit 550 controls the transaction related OTP app to be normally driven (executed). For example, when it is verified that the network is in the deactivated state, the control unit 550 may control an operation of the GUI screen displaying unit 540 to display the GUI screen for generating the transaction related OTP or control an operation of the OTP generating unit 530 to generate the transaction related OTP through the operation of the GUI screen displaying unit 540 like exemplary screens of FIGS. 27 to 31 to be described below.

On the contrary, as the verified result of step S220 of FIG. 26, when it is determined that the network connection is not deactivated (that is, the network is connected), the control unit 550 may limit the driving of the transaction related OTP app (that is, disapprove the app execution) (see step S240 of FIG. 26). In this case, the control unit 550 may control a popup that guides the network deactivation through the GUI screen (that is, a popup that induces the network connection to be switched to the deactivated state (see FIG. 27)) to be displayed (see step S244 of FIG. 26). As a result, when the user executes the network interruption like step S248 of FIG. 26, the control unit 550 may finally control the transaction related OTP app to be executed.

Further, the network verifying unit 510 may verify whether the network connection is restored again every second or every predetermined period even while the transaction related OTP app is driven (see step S250 of FIG. 26). As a result, when the network connection is resumed, the control unit 550 may limit the driving of the transaction related OTP app or limit the execution of the function according to the app driving (see step S260 of FIG. 26).

In step S260 of FIG. 26, in the limiting of the driving of the transaction related OTP app, methods of displaying the guide popup for switching the network connection state to the deactivated state again and automatically and forcibly ending the network connection state, and the like may be used. According to an operating system installed in the user terminal, an operating system permitted to automatically deactivate or reconnect the network connection is present. Accordingly, in this case, the control unit 550 of the transaction related OTP app may directly control the network connection to be switched to an airplane mode or a network deactivation mode. To this end, the transaction related OTP app may subordinately include a network control unit.

Further, in step S260 of FIG. 26, in the limiting of the execution of the function according to the driving of the transaction related OTP app, data initialization of the transaction related OTP app, limitation of data processing (operating) according to the app driving, initialization of the app screen, and the like may be included. In this case, the initialized value may be transaction information that has been input or selected by the user, the OTP token value generated in the OTP generating unit 530, and the like. Alternatively, the initialized value may be all data that are currently generated or newly stored according the driving of the OTP app.

Unlike this, as the periodically verified result through the network verifying unit 510, when it is determined that the network connection is continuously in the deactivated state, the control unit 550 may control inputting of the transaction information on the GUI screen (see FIGS. 27 to 31) displayed through the transaction related OTP app, storing of the data on the transaction information by the transaction information storing unit 520, generating of the transaction related OTP by the OTP generating unit 520, displaying of the app screen by the GUI screen displaying unit 540, and the like.

In the embodiment of the present invention, the transaction information selected by the user may be used in the generation of the transaction related OTP through the transaction related OTP app. Referring to FIGS. 27 to 30, a case where a transaction bank (that is, a financial institution), deposit account information, and a transaction amount of money are used in the generation of the transaction related OTP is exemplified, but of course, the present invention is not limited thereto. That is, in the generation of the transaction related OTP, at least one of various transaction information including a transaction bank, a depositor name, a transaction amount of money, a deposit account number, a granted transaction number, a transaction condition, and the like may be used. Input items or selection items of the transaction information may be variously modified according to an app implementation method.

Further, in this case, according to the implementation method, the transaction information that has been input once is encoded and stored and then may be reused according to the user's selection if necessary. The user sets a nickname when frequently used transaction information is stored to easily call and use the transaction information hereafter. In addition, according to the implementation method, the input or reused transaction information is switched to a hash value to be transferred to the OTP generating unit 530.

The OTP generating unit 530 as a component responsible for the transaction related OTP algorithm may generate a transaction related OTP token value by receiving the selected transaction information in an OTP unique key value and an OTP variable value (time or/and the number of times of attempts) to transfer the generated transaction related OTP token value to the GUI screen displaying unit 540.

The GUI screen displaying unit 540 displays an OTP token history generated in the OTP generating unit 530 to the user (see FIG. 30). According to the implementation method, additionally, on the screen of the GUI screen displaying unit 540, in addition to the OTP token value, an 'OTP app end' or 'OTP app end and network renewal' button may be provided (see FIG. 31).

When the transaction related OTP app is an operating system permitted to directly control deactivation/activation of the network, the network just before the app end is driven by the network verifying unit 510 and the control unit 550 may control the app to end. In this case, the control unit 550 may additionally transmit the transaction information that is input or selected by the user just before the app ends after the network is renewed to another server.

Hereinabove, the case where the transaction information related with the deposit and withdrawal of the bank is used in the generation of the transaction related OTP is mainly described, but the transaction information to be used from the generation of the transaction related OTP may vary according to the nature of the transaction institution. For example, in the case of a stock company, the transaction information may be constituted by buying codes, buying quantity, a buying amount of money, and the like, in the case of a shopping mall, the transaction information may be constituted by product codes, order quantity, an order amount of money, and the like, and in the case of bonds or electronic money, the transaction information may be constituted by a transaction agency, a transaction number, a transaction amount of money, and the like of the transaction opponent.

Further, hereinabove, only the case where the transaction information is used in the generation of the transaction related OTP is mainly described, but code information identified for each user may be used in the generation of the transaction related OTP. For example, regardless of the transaction information, code information for identifying the user displayed on the OTP app screen (for example, a user identification code matched with numbers, letters, figures, and shapes shown through an image displayed in a rotary password selection key of a safe) may be used in the generation of the transaction related OTP.

Further, hereinabove, according to the verified result of the network connection state, only the case where the driving of the transaction related OTP app or the execution of the function according to the driving is limited or permitted is mainly described, but another additional limitation may be further present. For example, while the transaction related OTP app is driving, it is determined that the screen of the corresponding app is switched from a foreground state to a background state. In the case where the screen is switched to the background state, additional limitations may be further present to limit the driving of the transaction related OTP app or the execution of the function according to the driving.

Hereinabove, respective roles of the components related with the driving method of the transaction related OTP app in the user terminal are described. Hereinafter, an actually implemented example will be described so that the contents of the present invention can be more clearly understood.

First, in the case where the operating system of the user terminal supports the airplane mode (airplane boarding mode) setting or WiFi setting change in the app, when the transaction related OTP app is driven, the network verifying unit 510 verifies a current airplane mode value and a WiFi setting value to deactivate the network when the network is connected. If the operating system does not support the switching of the airplane mode or the WiFi mode, the operating system interrupts the app driving and guides releasing and accessing the network setting to the user.

If it is determined that the network is in the deactivated state, the GUI screen displaying unit 540 is driven to receive the transaction institution, the transaction account, the transaction amount of money, the transaction condition, and the like from the user. In order to store information on a frequently used transaction subject, if necessary, another name of the transaction subject is stored and the user may not unnecessarily input the transaction institution and the transaction account. In this case, according to the implementation method, the input value is encoded or modified to a hash value to be transmitted to a predetermined third external inspection server at the time when the network is renewed, and the app may end. The OTP generating unit 530 generates the OTP token value by using the transaction information and the like in the OTP unique value and the variable information (time or the number of times). The generated OTP token value is displayed on the GUI screen displaying unit 540.

In this case, the control unit 550 may control at least one of the driving of the transaction related OTP app or the execution of the function according to the driving to be limited, when a predetermined screen display setting time elapses after the transaction related OTP is displayed on the screen by configuring the screen display setting time. Alternatively, the control unit 550 may deactivate that the transaction related OTP app is continuously driven and indicates a selection button capable of inducing the network connection together with the OTP end to the user on the OTP display screen to provide the environment so that the user inputs the OTP to the transaction medium.

According to the embodiment, even though the OTP app is driven in the user terminal, the OTP token value is not leaked by the third party for a valid time.

Further, according to the embodiment, while the network is deactivated, the third party may not know whether any transaction information is input or selected by the user.

Further, according to the embodiment, as compared with a hardware-based transaction related OTP dongle having only a number input button in the related art, the transaction related OTP may be activated due to the convenient input structure of the user terminal, and the embodiment may have advantages of the continuously portable user terminal and economics of the software type.

The method and the device according to the embodiments of the present invention may be implemented in a program command form executable by various computer means and recorded in a computer readable medium. The computer readable medium may include one or a combination of a program command, a data file, and a data structure.

The program command recorded in the computer-readable medium may be specially designed and configured for the present invention, or may be publicly known to and used by those skilled in the computer software field. Examples of the computer-readable recording medium include magnetic media such as a hard disk, a floppy disk, and a magnetic tape, optical media such as a CD-ROM and a DVD, a magneto-optical media such as a floptical disk, and a hardware device which is specifically configured to store and examples of the program command such as a ROM, a RAM, and a flash memory. An example of the program command includes a high-level language code executable by a computer by using an interpreter, and the like, as well as a machine language code created by a compiler.

The hardware device may be configured to be operated with one or more software modules in order to perform the operation of the present invention, and an opposite situation thereof is available.

The present invention has been described with reference to the embodiments of the present invention. However, it will be appreciated by those skilled in the art that various modifications and changes of the present invention can be made without departing from the spirit and the scope of the present invention which are defined in the appended claims and their equivalents.

What is claimed is:

1. A computer implemented method for performing mutual authentication between an online service server and a service user comprising the steps of:
    (a) generating, by an authentication server, a simple authentication number when a generation request of the simple authentication number including user account information of the service user accessing the online service server is received from the online service server;
    (b) transmitting, by the authentication server, a generation condition used to generate the simple authentication number to a simple authenticator of a user corresponding to the user account information;
    (c) generating, by the simple authenticator, an inspection authentication number corresponding to the simple authentication number by using the generation condition of the simple authentication number; and
    (d) generating, by the authentication server, a corresponding inspection value to correspond to an additional inspection value transferred from the simple authenticator when inspection of the online service server through the simple authentication number and the inspection authentication number is completed and comparing whether the additional inspection value and the corresponding inspection value match each other to authenticate a corresponding service user.

2. The computer implemented method of claim 1, wherein the generation request of the simple authentication number is transmitted from the online service server to the authentication server when the user account information, which the service user inputs to an online site provided by the online service server, matches previously-registered account information of a corresponding user.

3. The computer implemented method of claim 1, wherein, in the step (b), the generation condition of the simple authentication number is transmitted from the authentication server to a mobile device of a user corresponding to the user account information or a simple authenticator installed in the mobile device through a push message or socket data communication.

4. The computer implemented method of claim 1, wherein, in the step (a), the authentication server further receives client access environment information related to an access terminal of the service user accessing the online service server from the online service server and uses the client access information when the simple authentication number is generated,
    wherein, in the step (b), the authentication server transmits the generation condition of the simple authentication number including the client access environment information to the simple authenticator.

5. The computer implemented method of claim 4, wherein the client access environment information is at least one of server variables related to an access terminal accessing the online service server, a host name, cookie information, a previous URL, a current connection IP address, a one-step-forwarded connection IP address, client browser information, client language information or system variables of the access terminal, a server host name of the online service server providing a service to the access terminal, a server IP address, a session ID, and maximum session valid time information.

6. The computer implemented method of claim 4, wherein, in the step (a), the authentication server sets the client access environment information as a first seed value and at least one piece of preset additional information as a second seed value and generates the simple authentication number using a time or a number of times of attempts as an operation condition, and
    wherein, in the step (c), the simple authenticator generates the inspection authentication number by applying the same generation condition as in a case of generating the simple authentication number.

7. The computer implemented method of claim 1, wherein, when inspection of the online service server is completed through the simple authentication number and the inspection authentication number, the simple authenticator generates an additional inspection value according to a preset condition and transmits the additional inspection value to the authentication server, and
    wherein the authentication server generates a corresponding inspection value by applying the same condition as the preset condition and when the additional inspection value matches the corresponding inspection value, notifies the online service server of normal authentication.

8. The computer implemented method of claim 1, further comprising transmitting, by the authentication server, the simple authentication number to the online service server such that the simple authentication number is disclosed on an authentication number disclosure screen provided by the online service server,
    wherein, when a posterior access using the same account information as the user account information of the service user is attempted before an inspection valid time of the simple authentication number through the authentication number disclosure screen elapses or before inspection of the online service server by the service user is completed, and
    wherein the authentication server maintains the simple authentication number generated according to an anterior access or prevents new generation of a simple authentication number according to the posterior access during the inspection valid time of the simple authentication number or until the inspection of the online service server is completed.

\* \* \* \* \*